INVENTOR
ALAN K. JENSEN
BY Charles L Johnson Jr.
ATTORNEY

INVENTOR
ALAN K. JENSEN

BY Charles L. Johnson Jr.
ATTORNEY

INVENTOR
ALAN K. JENSEN

BY Charles L. Johnson Jr.
ATTORNEY

INVENTOR
ALAN K. JENSEN

BY Charles L. Johnson Jr.
ATTORNEY

INVENTOR
ALAN K. JENSEN

BY Charles L. Johnson Jr.
ATTORNEY

INVENTOR
ALAN K. JENSEN
BY Charles L. Johnson Jr.
ATTORNEY

Oct. 24, 1967 A. K. JENSEN 3,349,369

APPARATUS FOR CHECKING READING ERRORS IN A MAGNETIC RECORD CARD SYSTEM

Filed Sept. 13, 1962 16 Sheets-Sheet 7

INVENTOR.
ALAN K. JENSEN

BY Charles L. Johnson Jr.
ATTORNEY

INVENTOR.
ALAN K. JENSEN

BY Charles L. Johnson Jr.
ATTORNEY

INVENTOR
ALAN K. JENSEN

BY Charles L. Johnson Jr.
ATTORNEY

Oct. 24, 1967 A. K. JENSEN 3,349,369

APPARATUS FOR CHECKING READING ERRORS IN A MAGNETIC RECORD CARD SYSTEM

Filed Sept. 13, 1962 16 Sheets-Sheet 10

INVENTOR.
ALAN K. JENSEN

BY

ATTORNEY

Oct. 24, 1967 A. K. JENSEN 3,349,369

APPARATUS FOR CHECKING READING ERRORS IN A MAGNETIC RECORD CARD SYSTEM

Filed Sept. 13, 1962 16 Sheets-Sheet 11

INVENTOR.
ALAN K. JENSEN
BY Charles L. Johnson Jr.
ATTORNEY

Oct. 24, 1967 A. K. JENSEN 3,349,369

APPARATUS FOR CHECKING READING ERRORS IN A MAGNETIC RECORD CARD SYSTEM

Filed Sept. 13, 1962 16 Sheets-Sheet 12

INVENTOR
ALAN K. JENSEN

BY Charles L. Johnson Jr.
ATTORNEY

INVENTOR.
ALAN K. JENSEN
BY Charles L. Johnson Jr.
ATTORNEY

Oct. 24, 1967 A. K. JENSEN 3,349,369

APPARATUS FOR CHECKING READING ERRORS IN A MAGNETIC RECORD CARD SYSTEM

Filed Sept. 13, 1962 16 Sheets-Sheet 14

INVENTOR
ALAN K. JENSEN

BY Charles S. Johnson Jr.
ATTORNEY

INVENTOR
ALAN K. JENSEN

BY *Charles L. Johnson Jr.*
ATTORNEY

INVENTOR
ALAN K. JENSEN

BY Charles L. Johnson Jr.
ATTORNEY

United States Patent Office 3,349,369
Patented Oct. 24, 1967

3,349,369

APPARATUS FOR CHECKING READING ERRORS IN A MAGNETIC RECORD CARD SYSTEM

Alan K. Jensen, Dover, N.J., assignor to Litton Business Systems, Inc., a corporation of New York
Filed Sept. 13, 1962, Ser. No. 223,361
12 Claims. (Cl. 340—146.1)

This invention relates generally to information storage systems and more particularly to an information storage system employing record cards having a magnetizable coating on at least one surface thereof and associated transport and electronic circuitry for selectively reading information from or selectively recording information upon such magnetizable surface of said record cards.

Information may be read from, recorded on and erased from these record cards so as to provide an information storage system capable of updating the information on a record card. This eliminates the necessity of discarding an old record card and supplying a new one every time there is a need to change information on a record card. The apparatus is particularly useful with a computing apparatus which takes information from the magnetic record card, operates on the information and then returns the information or some new result, to the record card.

It is therefore a broad object of the invention to provide an improved information storage apparatus.

It is a further object of the invention to provide an improved information storage apparatus using magnetic record cards.

It is a further object of the invention to provide improved circuitry for controlling the movement of magnetic record cards proximate magnetic read record heads.

It is a further object of the invention to provide improved circuitry for controlling the recording of information on and reading information from magnetic record cards.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

Figure 3A:
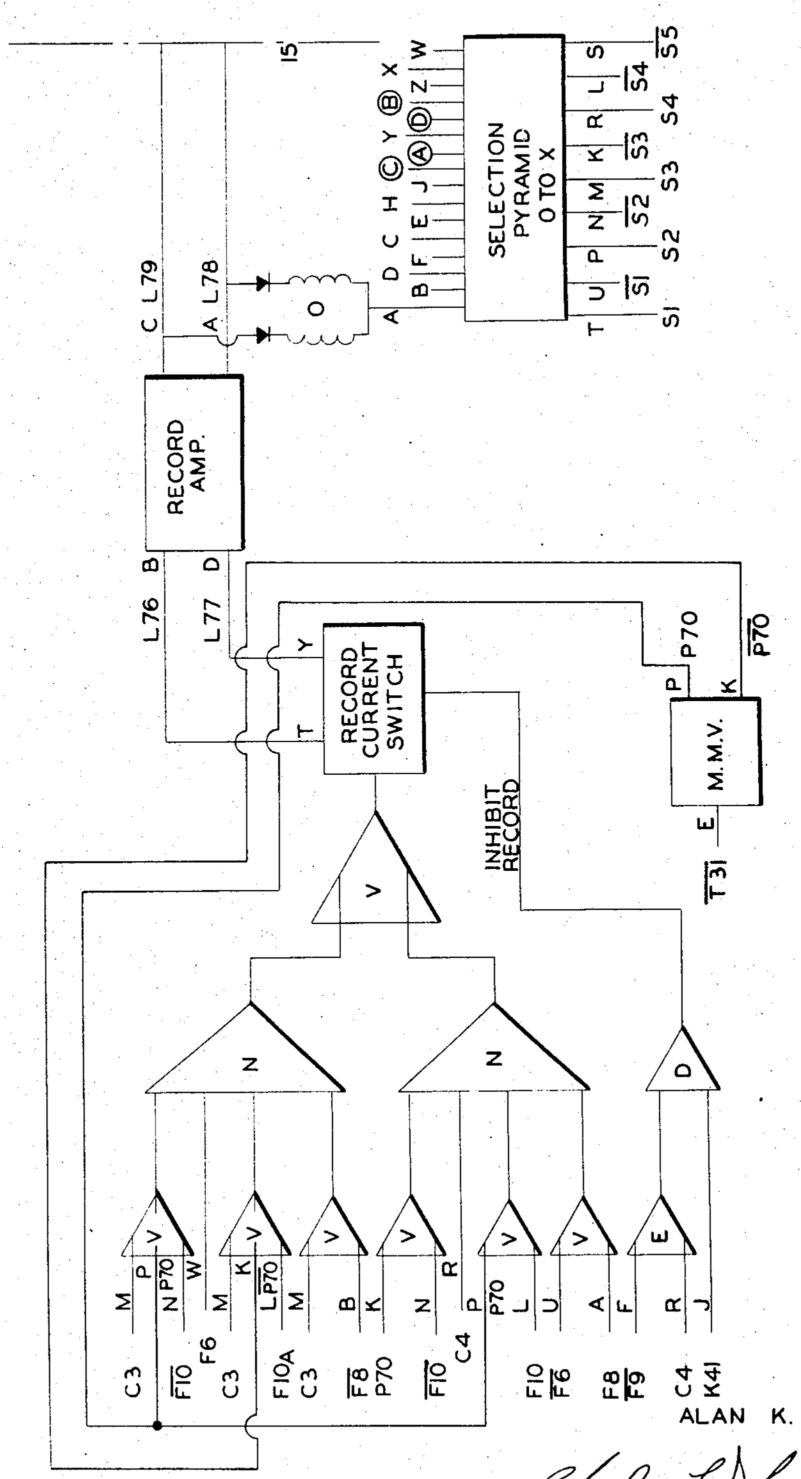
Figure 3B:
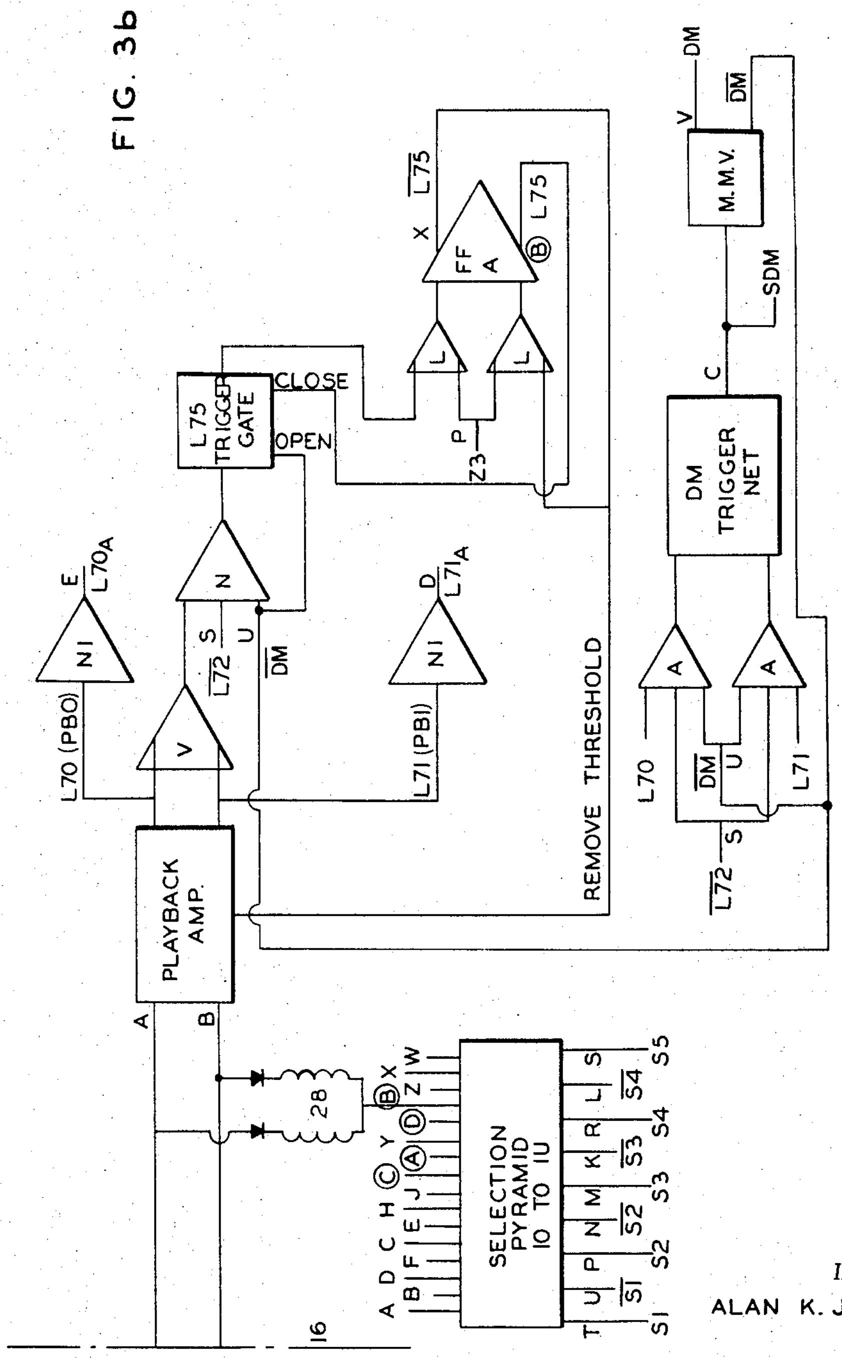
Figure 3:
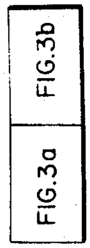

FIG. 3, composed of FIGS. 3*a* and 3*b*, joined as shown in FIG. 3, is a block diagram of the record logic and a portion of selection pyramid (FIG. 3*a*) and of the playback logic and the remainder of the selection pyramid (FIG. 3*b*).

Figure 3C:
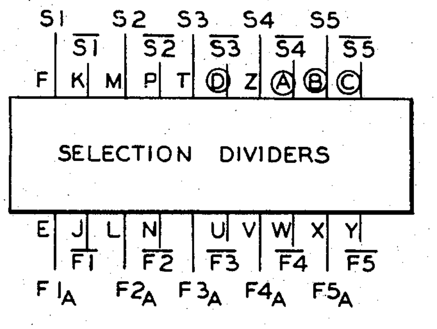

FIG. 3*c* is a block diagram of the selection dividers.

Figure 3D:
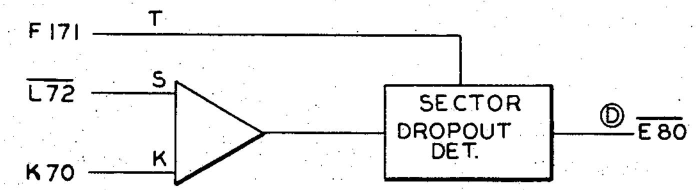

FIG. 3*d* is a block diagram of the Sector Drop-Out Detector.

Figure 3E:
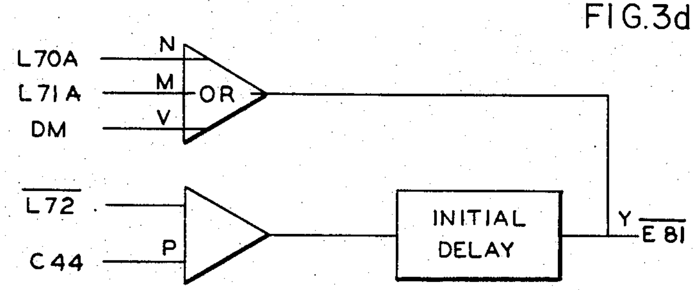

FIG. 3*e* is a block diagram of the Information Drop-Out Detector.

Figure 3F:
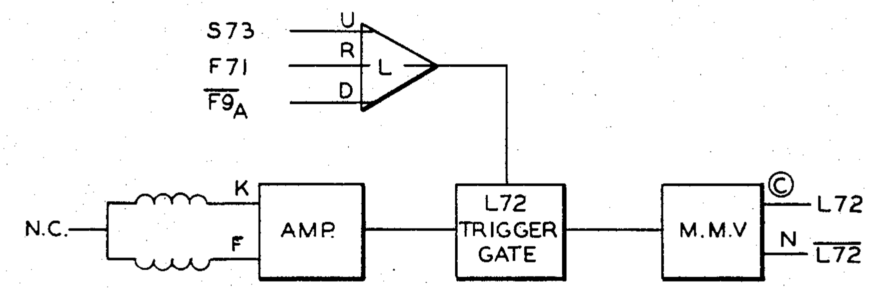

FIG. 3*f* is a block diagram of the Sector Playback System.

Figure 3G:
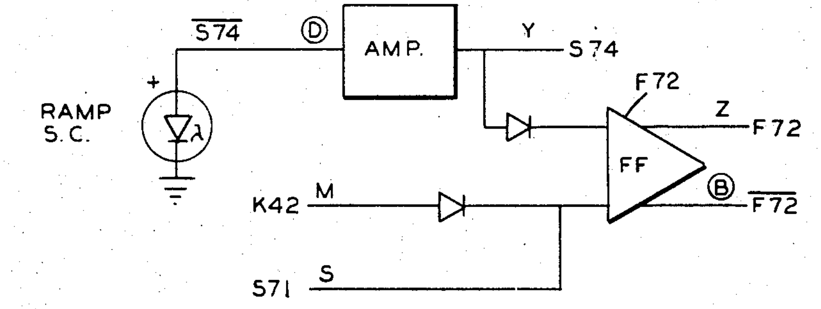

FIG. 3*g* is a block diagram of the F72 Flip-Flop and Ramp Photocell Amplifier.

Figure 3H:
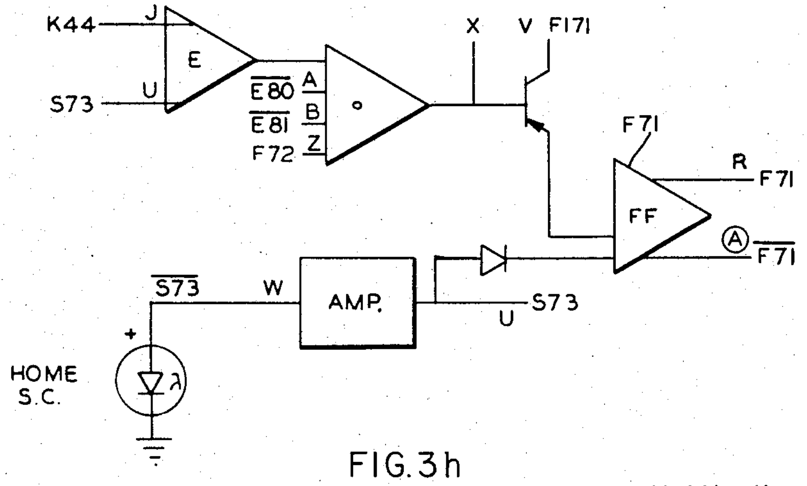

FIG. 3*h* is a block diagram of the F71 Flip-Flop and Home Photocell Amplifier.

Figure 3I:
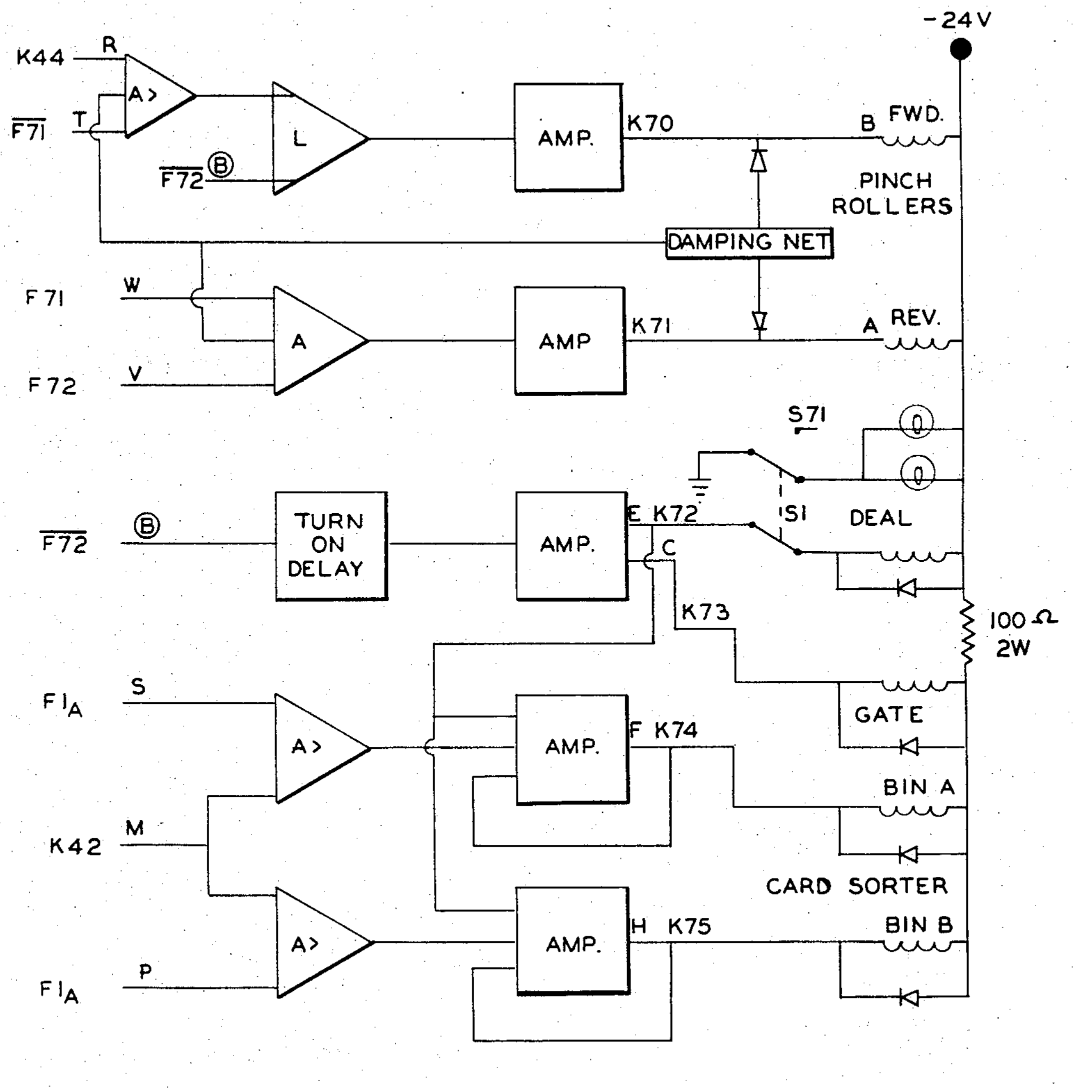

FIG. 3*i* is a block diagram of the Transport, Hopper and Bin Solenoid Drivers.

Figure 4:
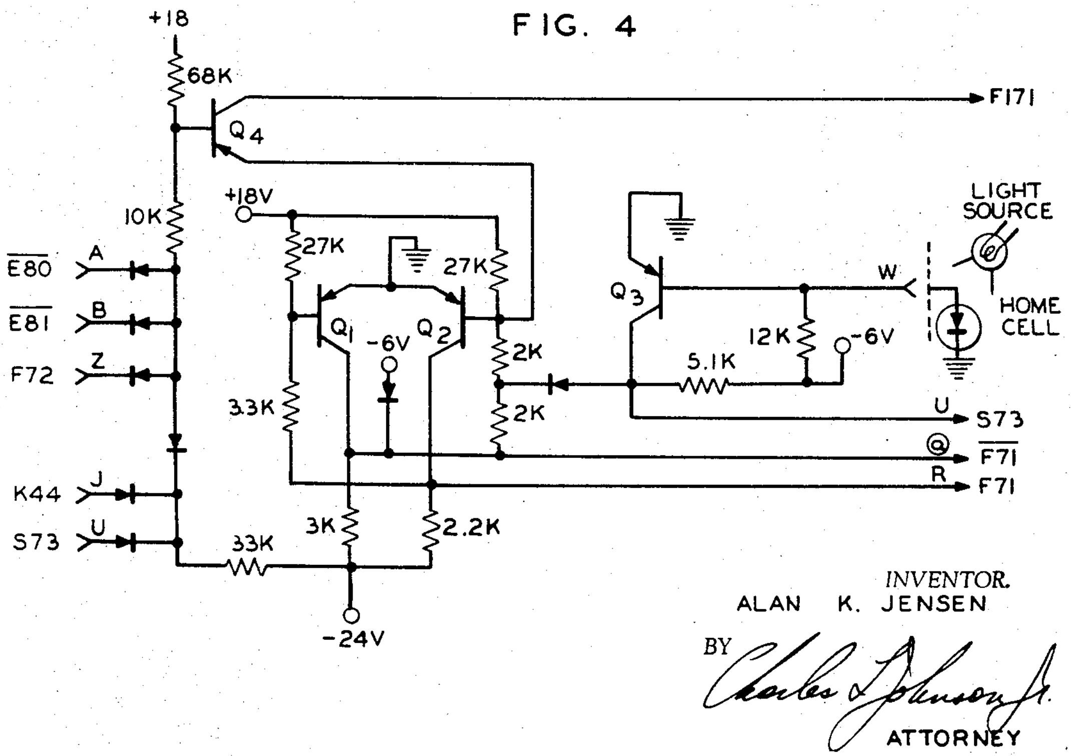

FIG. 4 is a schematic diagram of the F71 Flip-Flop and Home Photocell Amplifier of FIG. 3*h*.

Figure 5:
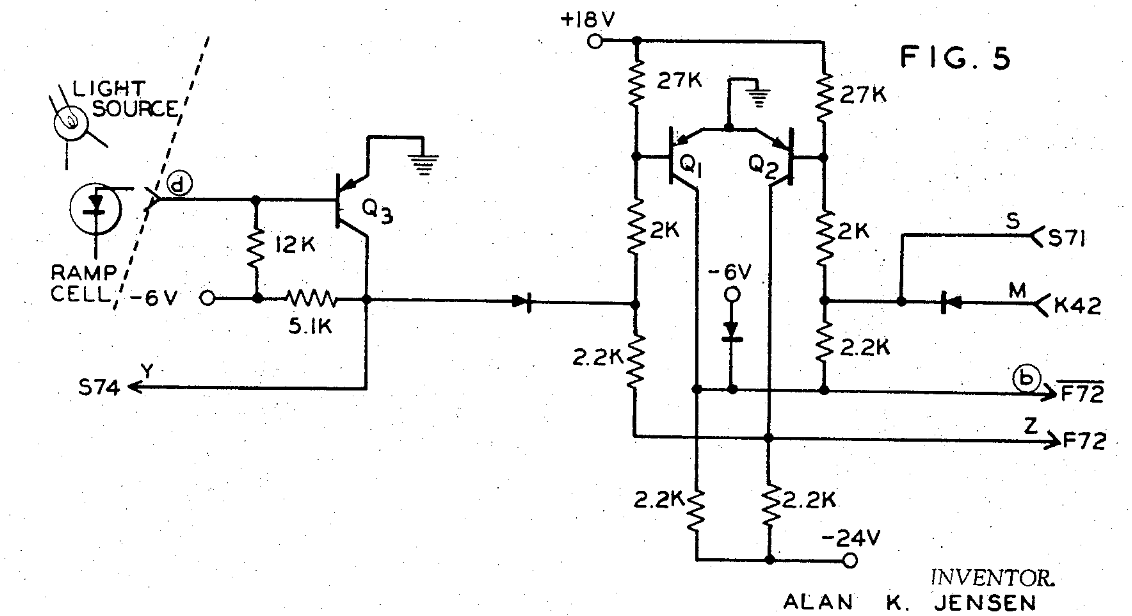

FIG. 5 is a schematic diagram of the F72 Flip-Flop and Ramp Photocell Amplifier of FIG. 3*g*.

Figure 6:
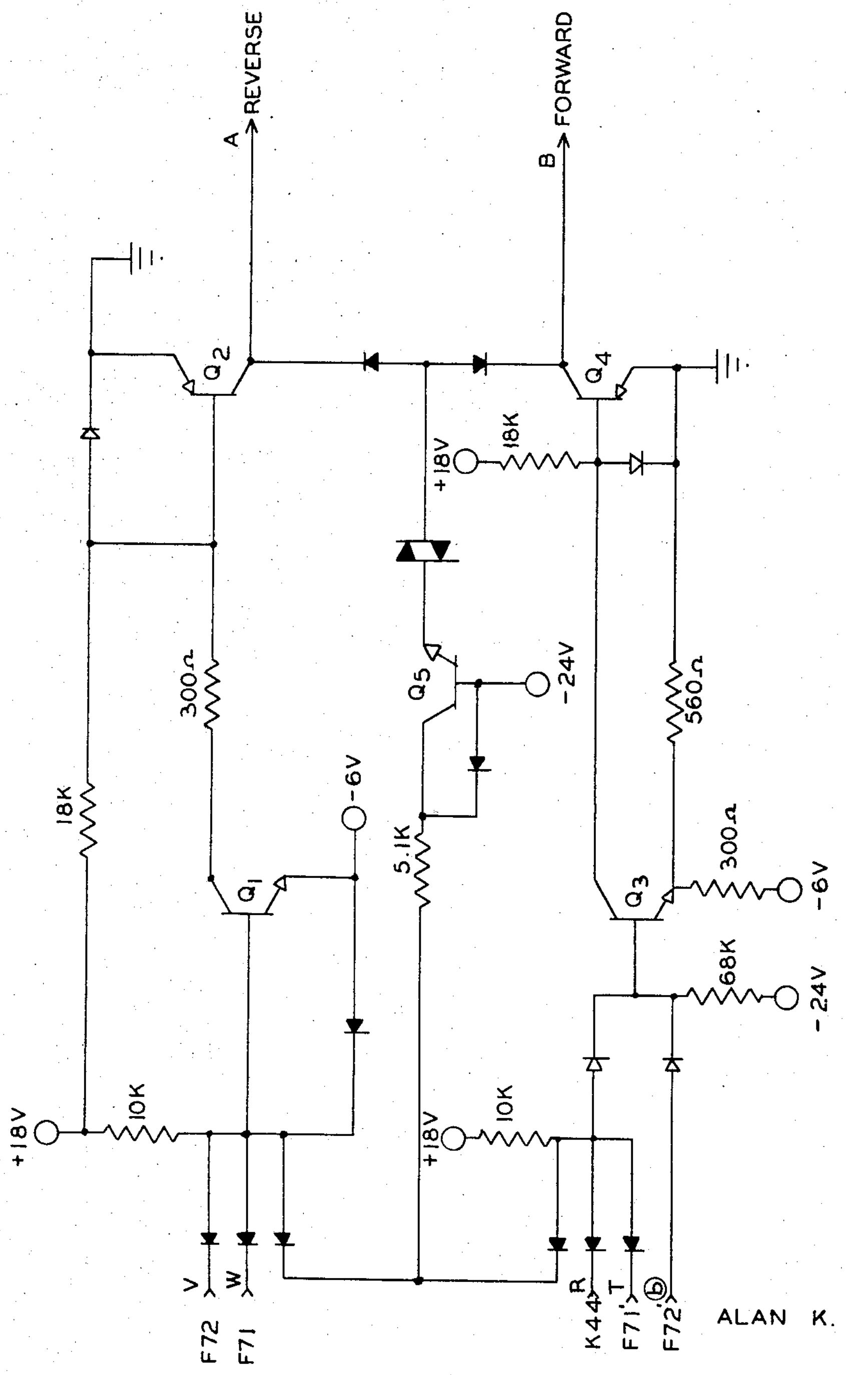

FIG. 6 is a schematic diagram of the Transport Solenoid Drivers of FIG. 3*i*.

Figure 7:
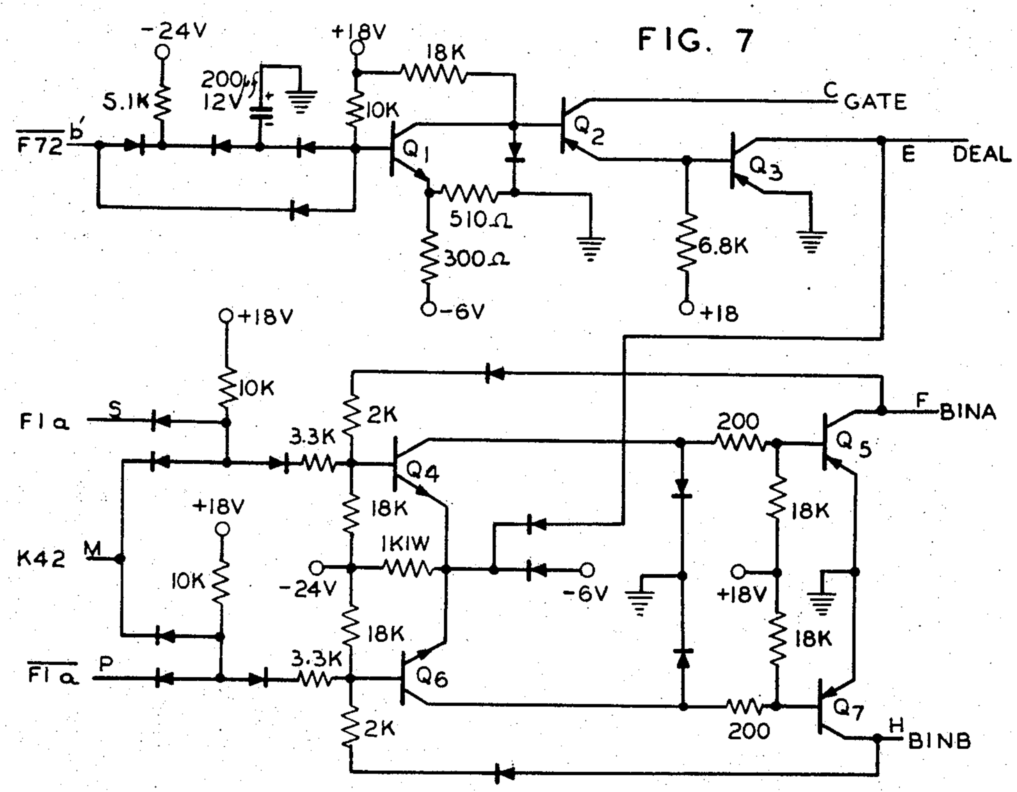

FIG. 7 is a schematic diagram of the Hopper and Bin Solenoid Drivers of FIG. 3*i*.

Figures 8, 9:
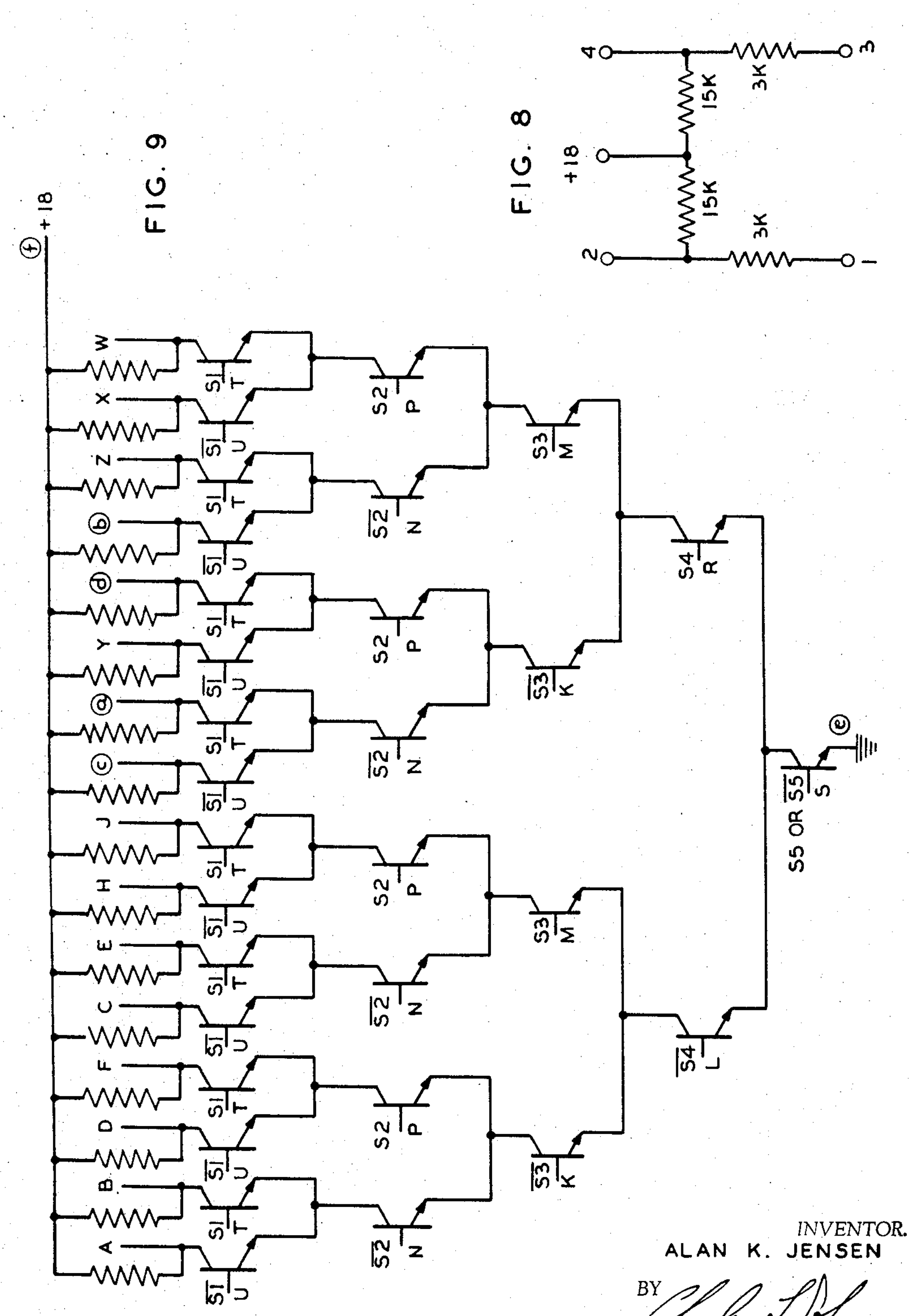

FIG. 8 is a schematic diagram of a selection voltage divider.

FIG. 9 is a schematic diagram of a portion of the head selection circuits of FIGS. 3*a* and 3*b*.

Figures 10A, 10B:
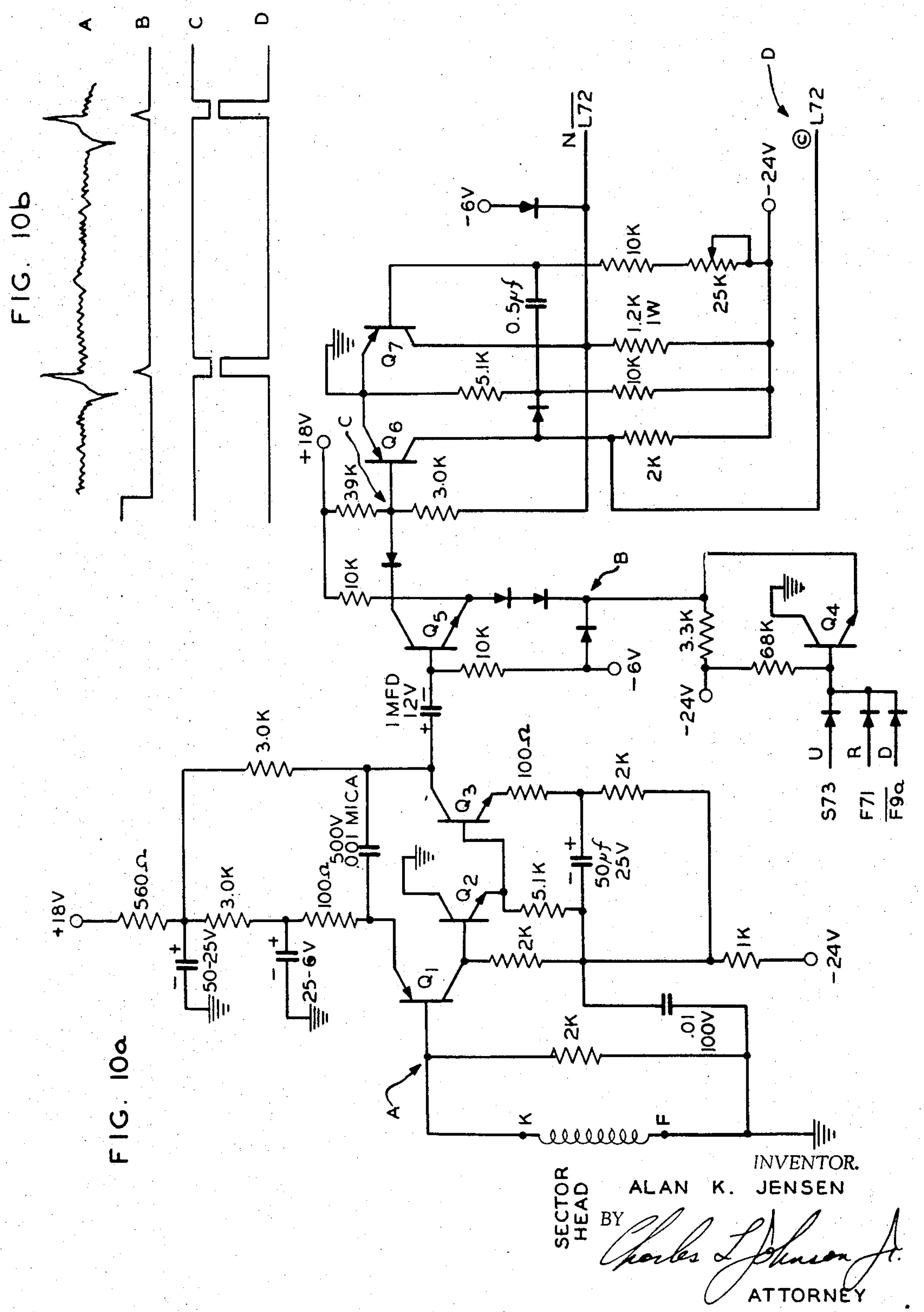

FIG. 10*a* is a schematic diagram of the Sector Playback System of FIG. 3*f*.

FIG. 10*b* illustrates the waveforms which may be detected at the indicated test points of FIG. 10*a*.

Figure 11:
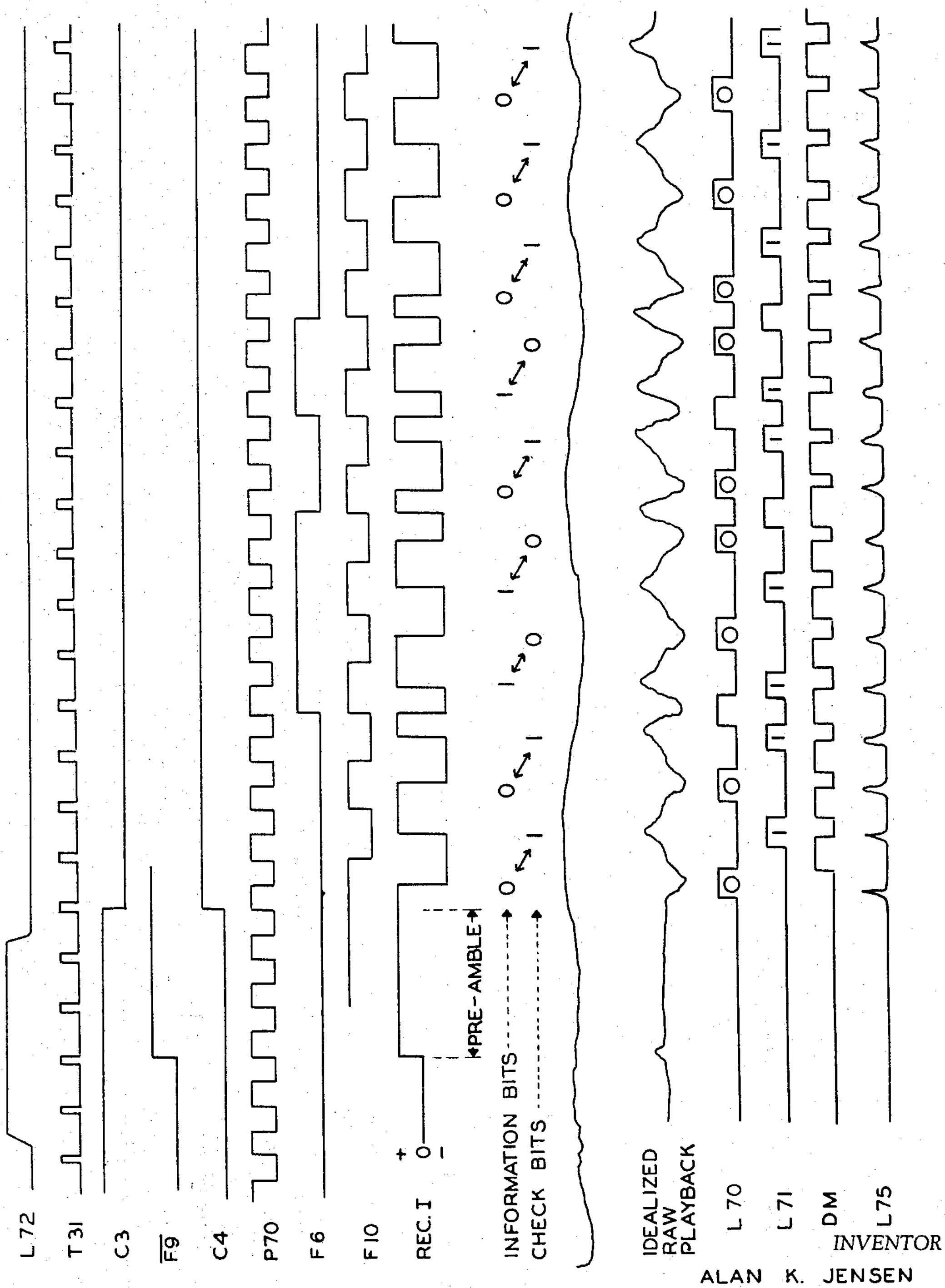

FIG. 11 illustrates typical record playback voltage waveforms.

Figure 12:
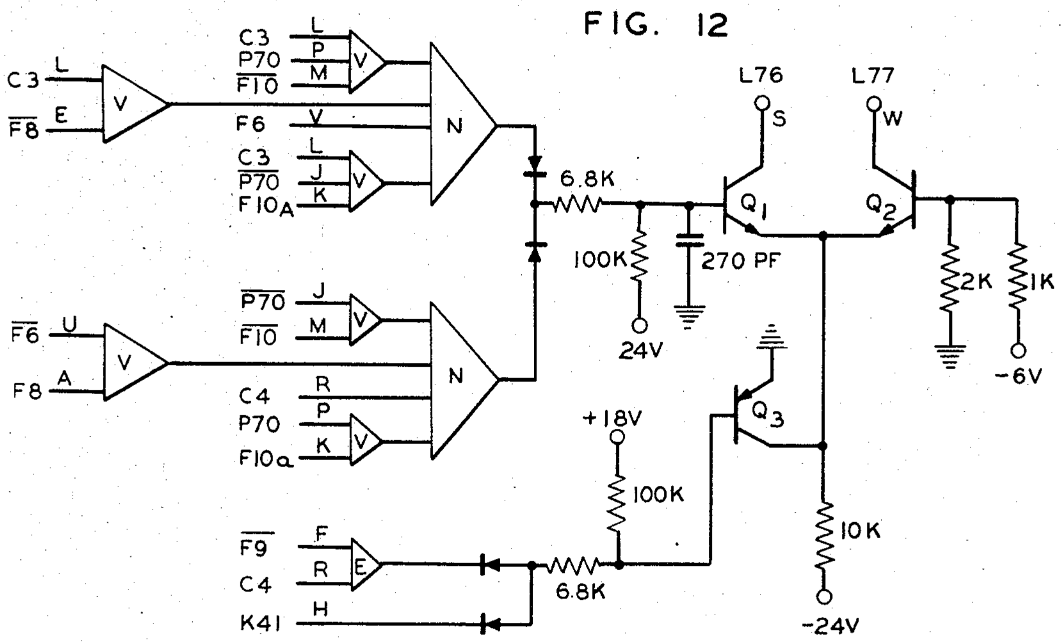

FIG. 12 is a schematic diagram of the Record Logic and Record Switch circuitry of FIG. 3*a*.

Figure 13:
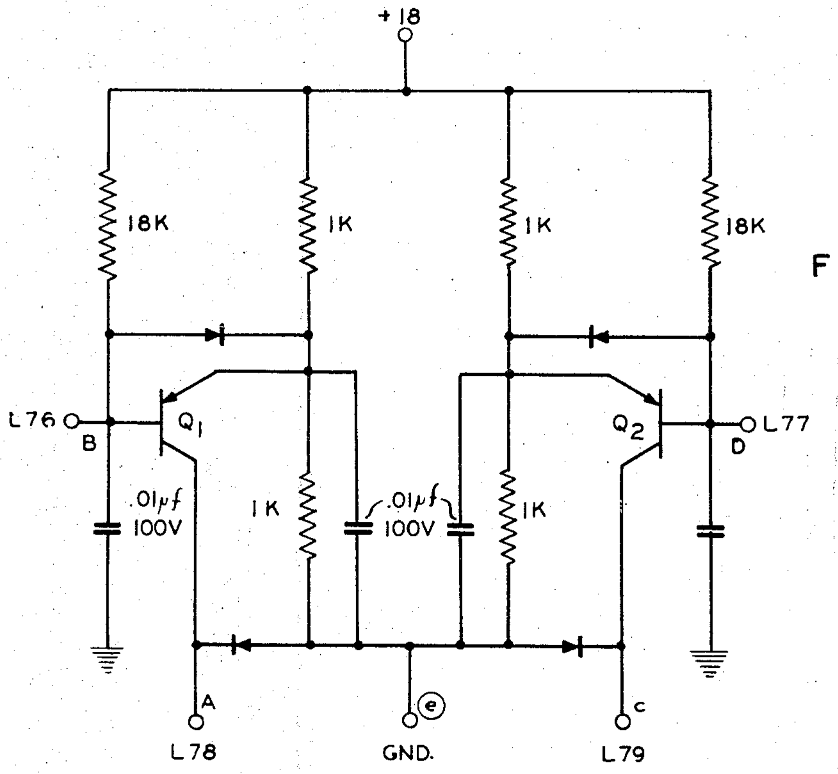

FIG. 13 is a schematic diagram of the Record Amplifier of FIG. 3*a*.

Figure 14:
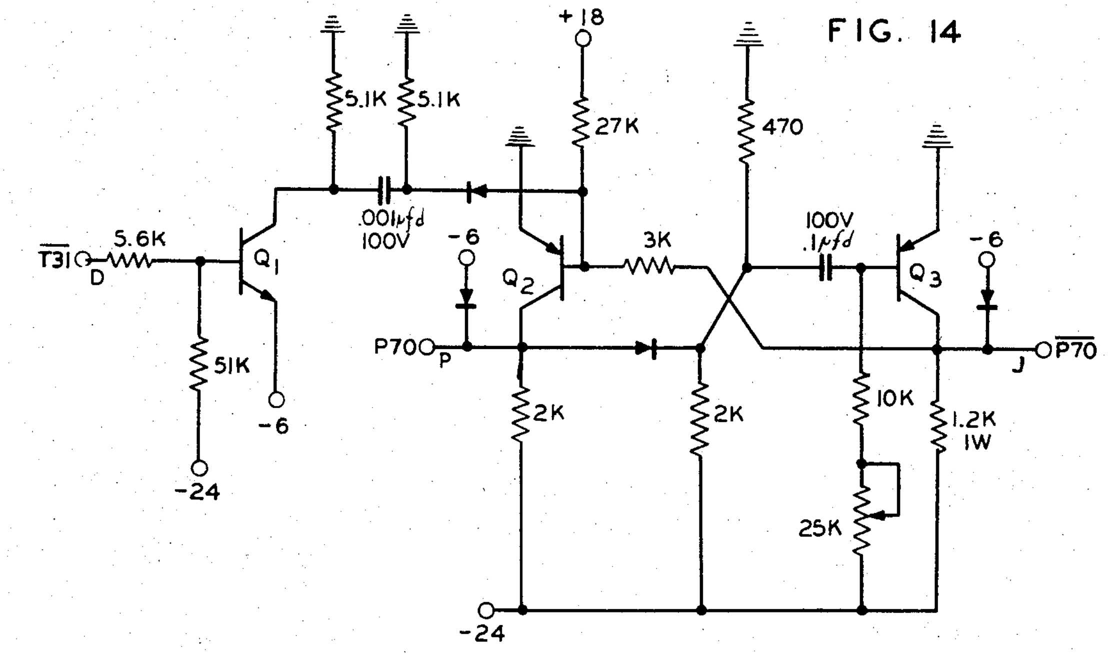

FIG. 14 is a schematic diagram of the Record Clock or P70 Pulse Generator of FIG. 3*a*.

Figure 15:
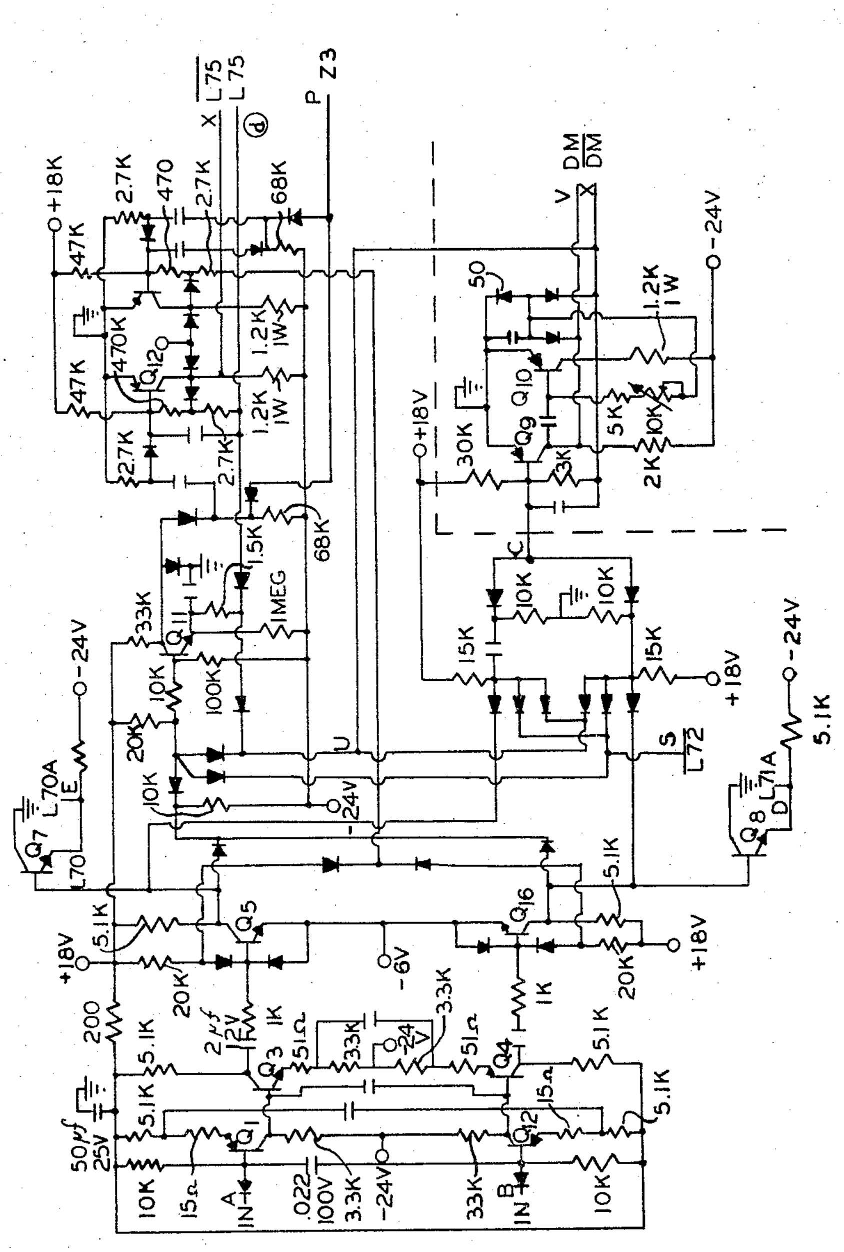

FIG. 15 is a schematic diagram of the Playback Amplifier and Sensing circuitry of FIG. 3*b*.

Figure 16:
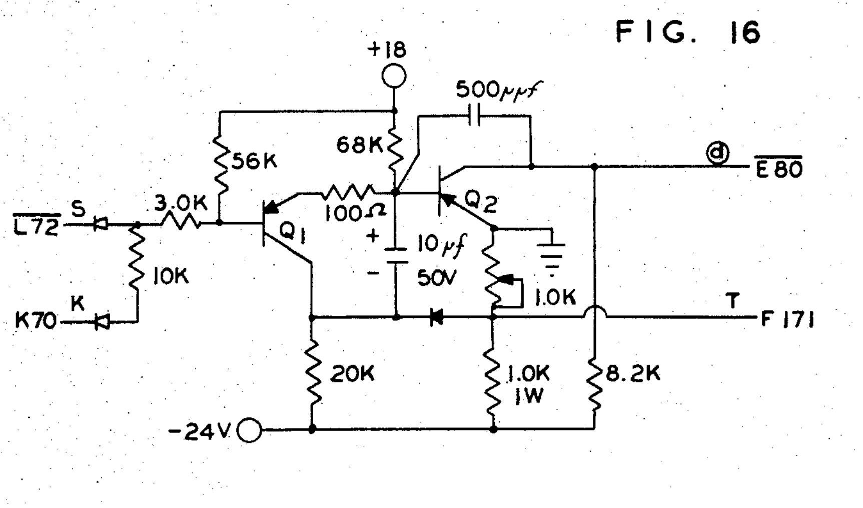

FIG. 16 is a schematic diagram of the Sector Drop-Out Detector of FIG. 3*d*.

Figure 17:
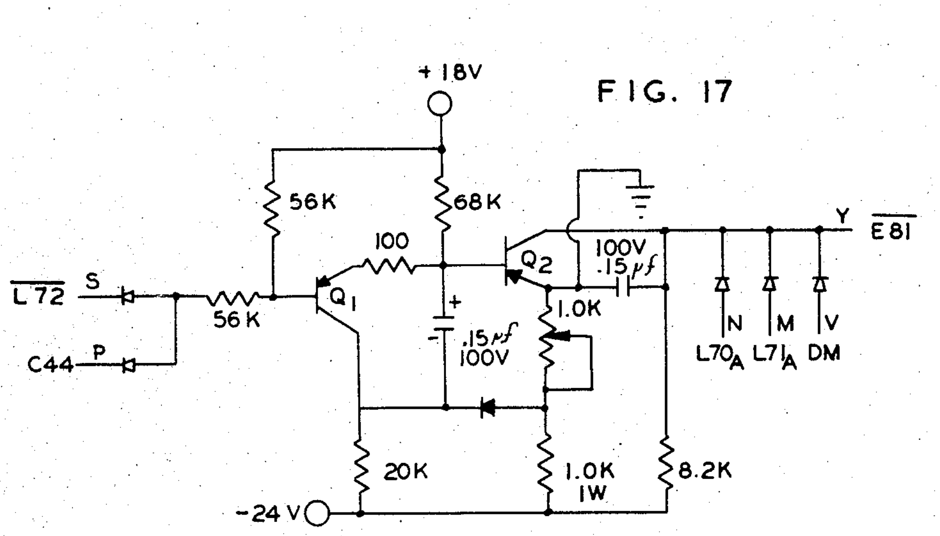

FIG. 17 is a schematic diagram of the Information Drop-Out Detector of FIG. 3*e*.

Figures 1, 2:
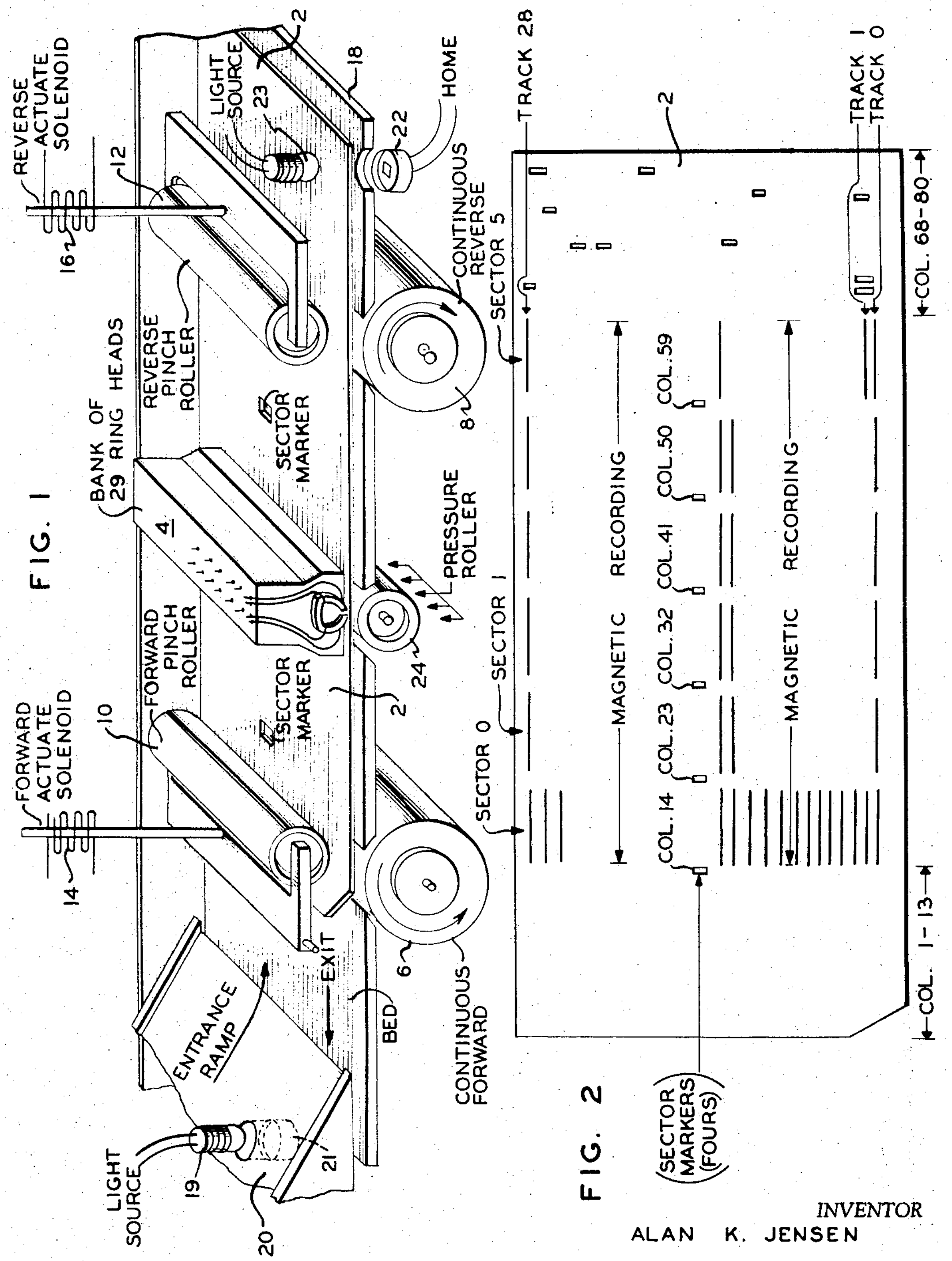
FIG. 1 is a perspective representation of the magnetic record card transport apparatus.
FIG. 2 is a view of one type of card used by the magnetic record card transport.
Figure 18:
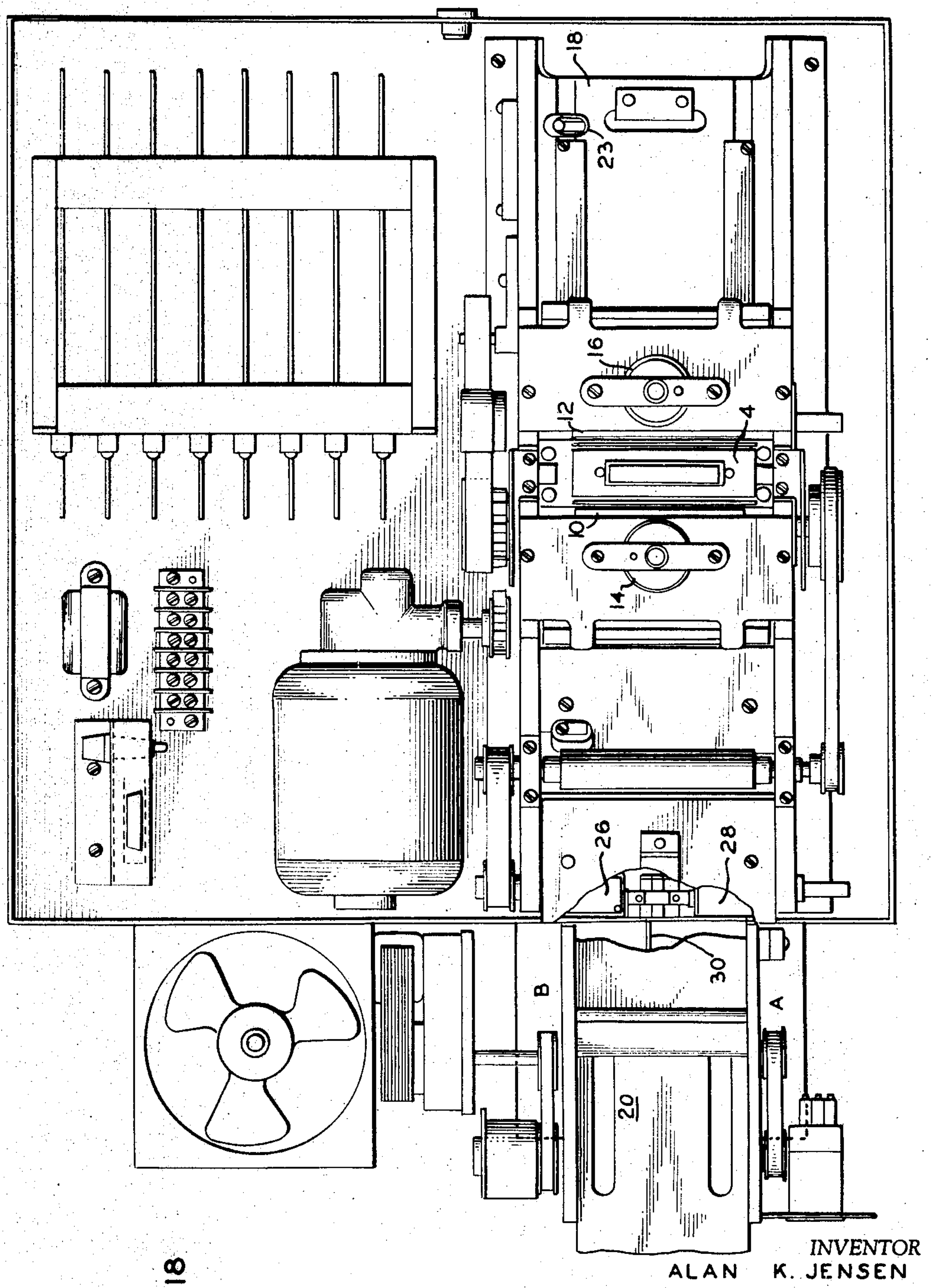

FIG. 18 is a plan view of the magnetic card transport of FIG. 1.

The system utilizes standard record cards coated with a magnetic surface as the storage medium. Since recording is by magnetic recording rather than by punching, as is done in the usual arrangement, a far greater amount of information can be recorded upon the record card than is possible in punched record card systems.

The magnetic record card system may be utilized as an auxiliary to electronic computer devices.

The basic record card transport for selectively transporting and positioning the record card may be understood by reference to FIG. 1. The record card transport is described in greater detail and claimed in copending application Ser. No. 223,362, filed Sept. 13, 1962 entitled "Magnetic Card Reader and Transport" by Raddin and LaManna and assigned to the assignee of the instant invention. The record card 2 is transported in a reciprocating fashion in contact with a head bank 4 containing 29 ring type magnetic read write heads. The drive source for record card 2 movement is supplied by a pair of counter rotating drive rollers 6 and 8. The record card 2 is friction driven by one or the other of the rollers 6 or 8 when an associated pinch roller 10 or 12 is operated through a solenoid 14 or 16. The record card 2 can thus be driven forward if pinch roller 10 is operated by solenoid 14 to cause contact between the record card 2 and the pinch roller 10 and the forward drive roller 6, reverse if pinch roller 10 is operated by solenoid 12 to cause contact between the record card 2 and the pinch roller 12 and the reverse drive roller 8 or will stand still if neither pinch roller solenoid 14 or 16 is actuated. This is illustrated in the sketch of FIG. 1. The card is supported on a fixed platform 18 called the bed. Apertures in the bed allow contact with the drive rollers 6 and 8.

Record cards 2 enter and exit the transport from the same end of the bed 18. The record card supply (not shown) and entrance ramp 20 are elevated over the bed 18 and the exit route is under the entrance ramp 20.

Record cards 2 may be ejected under computer control (not shown) or by a manual eject switch (not shown) at any time and may be selectively placed in one of two output bins (not shown) under computer control.

A solenoid operated clutch (not shown) serves to deal (as used in this description the term "deal" is intended to describe the operation of feeding the lowest card from the supply stack into the record card transport) a record card 2 from the bottom of the supply stack (not shown) and down the entrance ramp 20. The deal solenoid is operated automatically following an eject command that is, deal is involuntary and the system will insist on maintaining a record card 2 in the transport unless prevented by operation of a manual switch (not shown) provided for that purpose.

A second solenoid, called the gate solenoid (not shown) is operated simultaneously with the deal clutch. This solenoid is used to remove a pin (not shown) which blocks the entrance ramp 20 except when the clutch is operated. The pin blocking the entrance ramp 20 prevents manual force feeding of record cards 2 into the bed 18.

The end of the bed 18 opposite the entrance ramp 20 is called the "home" position from which all read and write operations must commence. When in the home position the record card 2 interrupts a path from a light source 23 to a photocell 22, thereby signifying the record card 2 is at the home position and signifies the end of travel in the reverse direction. The reading or writing is done as the record card 2 travels in the direction away from the home position, that is the forward direction and is returned to the home position when the operation is complete unless an eject command is provided.

A pressure roller 24 contacts the under surface of the record card 2 directly beneath the air gaps of the individual heads of the head bank 4 and serves to maintain head to card contact.

The head bank 4 is made up of 29 ring type, ferrite core read write heads, representing the 29 channels of information. Only one head is in use at any one time and simultaneous read and write is normally not done. The track width in the tracks along the length of the record cards 2 in the preferred embodiment is .040" with a .001" air gap length. The windings are 1,000 turns of #44 wire, center tapped. A head located near the center of the record card 2 width is used exclusively for reading marker or sector pulses which signify the beginning of each word sector on a track. This head is physically different in that the pole-pieces are .100" wide to yield superior signal to noise characteristics.

The record card 2 is shown in FIG. 2. The record card 2 in the preferred embodiment is standard punched card stock 3¼" x 7⅜" x .007" with an iron oxide coating on one face .001" thick.

There are 29 magnetic tracks running lengthwise on the card containing 6 words each. Each word being located in a separate one of the six sectors in each track. The words are 66 bits long with 34 of these bits reserved for redundancy checking. The bit density is 100 bits per inch on a track and the tracks are spaced on .1" centers.

There are 13 standard punching columns at each end of the record card 2 which may be used for identification and sorting. The number of punching columns may be increased by reducing the number of magnetic sectors used.

There are holes in the columnar positions corresponding to a standard punched record card at columns 14, 23, 32, 41, 50 and 59 at the position that would normally be occupied by the four row of a standard punched record card. These 6 holes are used to identify the start of sectors on the magnetic tracks and are read magnetically by the sector head described hereafter. Information may also be printed on the card.

FIGS. 3*a* and 3*b*, connected as shown in FIG. 3, together with FIGS. 3*c*, 3*d*, 3*e*, 3*f*, 3*g*, 3*h*, and 3*i*, illustrate the basic electronic circuitry of the magnetic card transport of FIGS. 1 and 18. Circuits are grouped which indicate the printed circuit board on which they are located. Pin numbers for between board connections are included. Some circuit components are drawn in detail, where a suitable logical symbol does not exist.

*Record card control*

Control of the record card 2 may be understood from the following description when taken with FIGS. 1, 2, 3*a* through 3*i* and 18.

The two flip-flops F71 and F72 (see FIGS. 3*h* and 3*g* respectively) are used to control record card 2 movement in the transport. Decoding of these flip-flop conditions and subsequent operation of an appropriate solenoid is accomplished by five solenoid drive circuits forward and reverse pinch roller, deal, gate and card sorter (the card sorter solenoid controls the deflector to determine whether an ejected record card 2 will enter the bin A or bin B selection pockets), as shown in FIG. 3*i*. Two photocells and amplifiers are also used in controlling record card 2 movement. These are the home photocell 22 creating signal S73 and the ramp photocell 21 creating signal S74.

Operation of the circuitry to control the movement of record cards 2 in the transport may best be understood through an example of ejecting a record card and obtaining the next one.

One of two eject signals can be supplied to reset flip-flop F72. A K42 eject command signal may be supplied by the computer or the manual eject signal S71 from the manual eject switch S1. Either signal arriving at the input to flip-flop F72 (see FIG. 3*g*) sets the $\overline{\mathbf{F72}}$ side high (high=0 volts) and F72 low (low=−6.0 volts). The input logic to the solenoid drive circuits (see FIG. 3*i*) is such that regardless of other input conditions, when the $\overline{\mathbf{F72}}$ output line of the flip-flop F72 is high the record card 2 will be driven forward and out. Eject is therefore unconditional. Simultaneously, K42 signal operates one of the two solenoid drivers 26 or 28, shown in FIG. 18, to operate a deflector 30 placing the ejected record card 2 into bin A or B dependent upon the output condition of a computer flip-flop F1 (not shown). Since the computer eject command signal K42 is very short in duration compared to the time necessary to operate the deflector 30 (see FIG. 18), the two driver circuits are made regenerative (note signals K74 and K75) to provide continued drive to the deflector 30.

Further examination of the solenoid drivers reveals that after a delay sufficient for the ejected record card 2 to clear the bed 18, the output of flip-flop F72 on the $\overline{\mathbf{F72}}$ line will operate the deal clutch and send the next record card down the ramp 20. Simultaneous with operation of the clutch the same drive circuit operates a second solenoid to remove a gate pin (not shown) normally blocking the entrance ramp 20.

It should be noted that operation of the manual eject switch S1, to the position of S71 interrupting the connection to the deal clutch and thereby providing means for preventing the automatic deal. This is a two-position pushbutton switch and may be left in the S71 position. Indicating lamps associated with the pushbutton switch will be ON in the normal operate position, when the record card transport is ready to receive the next record card 2.

When the delayed signal K72 appears at the output of the deal drive circuit, the signal serves to reset whichever of the flip-flops selecting the bin had been set. The deflector 30 itself is also bistable and when driven to either position will remain there without further drive. The two deflector drive circuits 26 and 28 (see FIG. 18) are merely acting as pulse stretchers to extend the output signal of the computer flip-flop F1 which was received at the time the K42 signal was received. Actually, the ejected record card 2 may not have yet reached the deflector 30 when the deflector drive is removed, making mechanical memory essential.

In the event of a manual eject the deflector 30 is not operated, there will be no K42 signal, and the record card 2 will go into the last selected bin.

Continuing the sequence of events and assuming the manual switch S1 to be in the normal deal position, the next record card will travel down the ramp 20 and the next electronic change occurs when the next record card 2 interrupts the light to the ramp photocell 21 on the ramp 20, creating signal S74. Interrupting the light causes the signal S74 to go high which in turn restores the flip-flop F72 (see FIG. 3*g*) and sets the flip-flop's output lines as follows: F72 high and $\overline{\mathbf{F72}}$ low signifying the next record card 2 is down the ramp 20 and entering the bed 18.

Flip-flop F71 meanwhile is in the condition wherein the output lines are set such that F71 is high due to the F72 input on the F71 set logic (see FIGS. 3*h* and 4). The diodes perform a negative or function so that with the signal F72 low, or the computer eject command signal K44 low, the F71 set logic, will provide a low out of pin X. This output is fed to the trigger transistor of flip-flop F71. As far as triggering flip-flop F71 is concerned, the transistor acts as an emitter follower pulling $\overline{\mathbf{F71}}$ low. An output is also taken from the collector of this transistor and is used in error detection which is described hereafter. F71 is set whenever an eject occurs due to the F72 input.

The combination of F71 and F72 both high provides drive for the reverse pinch roller solenoid 16 (see FIG. 1) and also removes drive from forward, and deal solenoid (see FIG. 3*i*).

The record card 2 will thus travel in reverse, toward the home position, until the light to the home photocell 22 is interrupted causing S73 to go high. S73 going high will reset F71 low by pulling $\overline{\mathbf{F71}}$ high stopping the reverse drive. This completes the eject and deal cycle. The condition now is $\overline{\mathbf{F71}}$, S73, and F72 high. This may be thought of as the ready condition from which all read and write operations must commence. Even if K44, read or write, signal is high when the next record card 2 is traveling in, the ready condition cannot be reached until the record card 2 arrives at the home position.

To commence a read or write operation the signal K44 will go high and if the ready condition exists, the forward drive solenoid 14 (see FIG. 1) will be operated. The record card 2 will travel forward so long as the K44 signal is high and during the travel the read or write operation will take place in the proper address. The method of finding the proper address is described hereafter. As soon as the reading or writing is complete the computer will allow the signal K44 to return low removing the forward drive.

During its forward travel the record card 2 left the home position yielding S73 low. At this point, the F71 set logic provides a low to the trigger transistor due to signals K44 and S73 both being low. Flip-flop F71 therefore gets set and reapplies the reverse drive sending the record card 2 to the home position. As soon as S73 reappears flip-flop F71 will get reset and the ready condition exists once more. Note here that signal K44 may be returned high before the record card 2 arrives at the home position in preparation for the next read or write cycle.

*Card control circuits*

FIG. 4 is a schematic diagram of the F71 flip-flop and the photocell amplifier providing the home signal S73, shown in the block diagram of FIG. 3*h*.

The flip-flop made up of transistors $Q_1$ and $Q_2$ is a common resistance coupled circuit with no provision for fast turnover. That is, no speed-up capacitors or anti-saturation techniques are required since turnover times of several microseconds are more than satisfactory.

The coupling resistor on one side of the flip-flop, leading to the base of transistor $Q_2$, is divided in order to supply an appropriate point for DC triggering by the signal S73. Both the coupling and collector resistors have been selected to accommodate the particular load and drive requirements. Only $\overline{\mathbf{F71}}$ is supplied with a clamp diode since F71 receives clamping at one of the loads it drives.

Flip-flop F71 is set whenever the input to the base of transistor $Q_4$ of FIG. 4 moves below DC ground. Transistor $Q_4$ acts as a emitter follower to provide triggering from high impedance logic and pulls the base of transistor $Q_2$ negative forcing it on and transistor $Q_1$ off through the flip-flop feedback connection. The logic from which the triggers for F71 are derived is a negative AND-OR connection to provide the function already described. The input to transistor $Q_4$ of FIG. 4 is shifted positive by the divider in order to guarantee transistor $Q_4$ off under the no signal condition. The collector of transistor $Q_4$ is not returned directly to a power supply as in the case of most emitter follower circuits. The collector circuit is located elsewhere where a signal from the collector provides a second function. This is described hereafter relating to sector drop-out detection. The impedance of the collector circuit of FIG. 4 is low enough to provide the required follower function to F71.

Transistor $Q_3$ of FIG. 4 provides amplification of the input from the home photocell 22 located at the home end of the bed 18 and thereby creates the signal S73. The photocell 22 is essentially a current source which, when illuminated, will supply all the current required by the 12K base resistor. Transistor $Q_3$ is held off due to lack of base drive and S73 is approximately −6 volts. When the photocell 22 is covered, record card 2 is at the home position, the photocell current drops to near zero and the 12K resistor is forced to pull current from the base of transistor $Q_3$. Transistor $Q_3$ of FIG. 4 turns on and its collector, S73, rises to near ground. As a result, the midpoint of the base drive divider for transistor $Q_2$ is moved to near ground and current through the 27K base bias resistor forces transistor $Q_2$ off and the flip-flop action is to reset $\overline{\mathbf{F71}}$ high. The collector load resistor of transistor $Q_3$ is returned to −6 volts to avoid the need for a clamp diode and as a result, the lower level of S73 may vary slightly with loading.

The photocells 21 and 22 in the preferred embodiment are Hoffman type 58C silicon solar cells and the light sources are Tung Sol #4 readout lamps.

FIG. 5 is a schematic of the F72 flip-flop and the ramp photocell amplifier S74, shown in the block diagram of FIG. 3*g*.

Design and operation of the S74 amplifier is identical to S73.

The F72 flip-flop is essentially the same as F71 except that both coupling resistors have been divided to provide positive DC trigger points. Within the F72 flip-flop only $\overline{\mathbf{F72}}$ is clamped.

FIG. 6 is a schematic of the solenoid drive circuits which actuate the pinch rollers for forward and reverse record card motion, shown in the block diagram of FIG. 3*i*.

Transistors $Q_1$ and $Q_2$ of FIG. 6 form the drive amplifier for the reverse pinch roller. The diode connected from emitter to base on transistor $Q_1$ of FIG. 6 serves to clamp both signals F71 and F72. It assures off bias for transistor $Q_1$ when either signal is low without the use of voltage dividers. That is, if either input is low there is forward current through the diode. Both transistors $Q_1$ and $Q_2$ are ON simultaneously if both inputs are high. The 300 ohms provides current limiting and the diode base to emitter in transistor $Q_2$ provides $V_{cb}$ limiting.

Transistors $Q_3$ and $Q_4$ of FIG. 6 form a similar amplifier for the forward drive solenoid with the following differences. In this case the input logic is two levels and the first level is made to supply enough excess current for base drive to transistor $Q_3$. OFF biasing of transistor $Q_3$ as well as current limiting is supplied by the 560 and 300 ohm divider in the emitter circuit.

It is possible for logical conditions on the amplifier inputs to be altered calling for a change in the direction of record card movement in perhaps one microsecond.

Since the inductive kick occurring on the solenoid release must be damped, it is probable that the new direction solenoid will be energized before the previously operated solenoid has released. This would result in simultaneous forward and reverse drive being applied and objectionable wear to pinch rollers and record card surface. To prevent this occurrence, the damping current for either solenoid is routed via the associated damping diode through the damping varistor and the transistor $Q_5$. Transistor $Q_5$ of FIG. 6 will be on whenever there is dampening current in either solenoid. A resistor is connected from the collector of transistor $Q_5$ to a diode in the AND input of each amplifier. Whenever, transistor $Q_5$ is on, due to damping current, the input of both drivers is held low preventing further drive. The overall result is that, before either solenoid can be operated, the other solenoid must be dropped out. When the damping current falls below the level required to hold the inputs low, approximately 3.0 ma., it is assumed that the solenoid has dropped out.

The initial damping current extracted from the emitter of transistor $Q_5$ is on the order of 200 ma. Most of this current flows from the −24 volt supply, through the high conductance diode connected to the collector, into the collector and out the emitter. This is true because the impedance of this path is much lower than the base resistance of transistor $Q_5$. If the high conductance diode were removed, the circuit would continue to operate satisfactorily but with the bulk of the current now flowing base to emitter. The only ill effect would be the high power peaks in the base resistance and shorter transistor life.

The nonlinear resistance of the varistor in the damping network is used to provide optimization of drop-out time and transistor voltage rating. The reduced drop-out time saves overall time of a complete read or write operation and in addition minimizes the wasted space at the ends of the record card.

FIG. 7 shows the schematics of the solenoid drivers for operation of the deal, ramp gate and output bin selector solenoids, shown in the block diagram of FIG. 3*i*.

Transistors $Q_1$, $Q_2$, and $Q_3$ of FIG. 7 form the driver for the ramp gate and deal solenoids. The network leading up to the base of transistor $Q_1$ of FIG. 7 serves to delay the rise of $\overline{F72}$ as viewed by transistor $Q_1$ without delaying the fall. The circuit provides the added requirement of isolating $\overline{F72}$ from the capacitive load. The delay in operating the deal solenoid is approximately .25 second. Recalling the logical operation, this delay is to allow the ejected record card to clear the bed 18 before injecting the next record card. Actually, the delay is such that the next record card is in the input ramp before the ejected record card actually clears the bed 18 and the record cards exit on and under the ramp 20 simultaneously. The delay is not acceptable in turning the deal solenoid off in order to prevent partial advance of the next record card in the input hopper.

The biasing and operation of transistor $Q_1$ of FIG. 7 is identical to transistor $Q_1$ in the forward solenoid drive circuit. The emitter of transistor $Q_2$, however, is returned to ground through the base of transistor $Q_3$. Transistor $Q_2$ collector drives the gate solenoid and transistor $Q_3$ the deal clutch. The collector current of transistor $Q_2$ becomes base drive for transistor $Q_3$. Since three transistors are needed for sufficient gain to drive both solenoids, the $Q_2$–$Q_3$ transistor connection offers advantages. One is the elimination of a relatively high power resistor dissipating uselessly in the transistor $Q_2$ collector circuit. A second is that the clutch will not be operated under most conditions of failure to open the gate. The solenoids require separate damping diodes.

Transistors $Q_4$ and $Q_5$ of FIG. 7 form a regenerative amplifier for driving the output deflector 30 (see FIG. 18) to the bin A position and transistors $Q_6$ and $Q_7$ do likewise for bin B.

The operation of the two amplifiers is similar to those described above except as follows. A feedback connection is made in each amplifier from the output transistor back to the input base thereby supplying the flip-flop action. The emitters of the input transistors $Q_4$ and $Q_6$ are made to share a current source which provides a common reset point. Assume a record card is to be ejected into bin A. At the appearance of the computer eject command signal K42 the computer flip-flop F1 will be programmed high providing a positive input current to transistor $Q_4$. The 3.3K and 18.0K resistive divider on the base of transistor $Q_4$ will pull the base more positive than the emitter, which had been clamped to near −6.0 volts. Transistor $Q_4$ and therefore transistor $Q_5$ turn on and the feedback network establishes additional base drive back to transistor $Q_4$. At this point the signals K42 and the output of the computer flip-flop F1 are free to return low and the computer may go on with other activities. The drive to the bin A solenoid continues while transistor $Q_4$ becomes saturated with an emitter potential of approximately −3.5 volts. Sometime later, the delayed drive to the deal solenoid will appear and that output is coupled to emitter of transistor $Q_4$ raising it to near ground. The divider action supplied by the 2.0K and 18K base resistors will yield transistor $Q_4$ off thereby resetting the bin A amplifier. When the drive to the deal solenoid is stopped, the emitters of transistors $Q_4$ and $Q_6$ of FIG. 7 will return to approximately −6.0 volts awaiting the next appearance of signal K42. Note that, at the appearance of deal, both bin amplifiers receive the reset signal. It is obvious that the bin amplifiers could be monostable circuits. Most one-shot circuits, however, require large capacitors and/or known rise times. Since the reset signal exists in any event, the addition of the one diode to insert it seems more appropriate. The reason incidentally for resetting at all, is merely to reduce power consumption in the bin solenoids.

*Addressing*

An address of a word stored on the record card 2 of FIG. 2 consists of two components which define its physical location. Part one is the track address which defines the particular head under which the word will pass and the second part is the sector address which selects one of the six words which will pass under the selected head. Track refers to a group of six words along the length of the record card and sector to a group of twenty-nine words across the width of the record card.

Both the track and sector address in which an operation is to take place must be established before a K44, read or write, command signal is given. That is, the rules for addressing demand that neither component of the address may be altered once the forward motion of the record card commences. This limitation is imposed by the method of locating the sector which will be described hereafter. It may be concluded that only one word may be written or read on each forward movement of the record card.

The track address selects which of the heads, 0–28, will be connected to the record and playback circuits. Both the record and playback are connected across the selected head and the interior electronics of each assures it will not interfere with operation of the other. They are never in use at the same time. This connection is shown on the block diagram, FIGS. 3*a* and 3*b*.

The selection of a head is made via a direct coupled transistor pyramid which is used to convert a five bit binary code from the computer into a one of thirty-two head selection code. The pyramid provides an approximate DC ground potential to the center tap of the selected head winding. The center tap of all other heads are held at a positive potential. As a result, the two common lines connecting the record and playback circuits are also at approximately DC ground. A current source, located in the playback amplifier, provides sufficient current through the diodes, in series with the head, to bias them to a low impedance point on their forward characteristics. The positive potential at the center tap of all other heads keeps the associated series diodes biased off. The diode biasing current through the selected head is near enough equal in the two head windings to provide canceling of the flux generated at the head gap.

The playback amplifier is always in operation. That is, playback is not deliberately switched off when recording or changing tracks. The output of the amplifier is merely ignored except at time of interest and recovery to proper operation following record or selection transients is made rapidly. The design of the playback amplifier provides protection against permanent destruction by transients.

The binary coded address is supplied by five flip-flops in the computer (not shown). The ten signals, complements included, are fed into voltage dividers providing a DC level shift and current limiting for driving the pyramid. A schematic of one divider is shown at FIG. 8. A schematic of one-half the pyramid is provided in FIG. 9. The complete pyramid consists of two identical pyramids differing only in that signal S5, is sent to one-half pyramid and $\overline{S5}$ to the other. On the block diagram of FIG. 3*a*, it can be seen the $\overline{S5}$ signal is applied to the selection pyramid O to X and is used to select heads 0 through 15. The signal S5 is applied to the one half pyramid of FIG. 3*b* marked selection pyramid 1O to 1U and selects heads 16 through 28 of head bank 4. Referring to the pyramid schematic, FIG. 9, if head seven coupled to the pyramid output line J were to be selected, the computer code would be F1, F2, F3, $\overline{F4}$ and $\overline{F5}$. The five flip-flop outputs would be applied to voltage dividers, as shown in FIG. 8 and, the outputs of these dividers, would be applied to the selection pyramid O to X as the signals S1, S2, S3, $\overline{S4}$ and $\overline{S5}$. As may be seen in FIG. 9, these signals operate the five transistors to output line J. In all other paths, at least one transistor is off and an open circuit exists between the center taps and ground. These center taps will be pulled to +18 volts by the resistors shown. Note that only one divider is needed for each of the computer signals although this divider may be connected to as many as 14 transistor bases. This is true because only one transistor being driven by each signal has a complete path to ground and can draw current from the divider. This simple analysis of course ignores the effect of leakage currents which forces the divider impedance to be relatively low.

A total of 32 addresses are available through selection but a smaller number of heads actually exist. If the number of required heads is 16 or less one selection pyramid may be removed without making any other changes.

*Sector address*

One track on the record card 2 is reserved for placement of markers which signify the start of each word on the information track. These markers, as described above, consist of six holes which are punched by a standard record card punch. The exact location of the holes can be seen on the record card layout diagram FIG. 2. The entire track on which the holes lie is magnetically biased in the same direction. A head in the bank, reserved for the purpose, detects the change in the flux created as a hole crosses the head gap. The resultant head output is amplified and shaped into a consistent pulse amplitude and width. This pulse, termed the sector pulse, is fed to the computer and signifies the start of each of the six word locations. The computer locates the sector of interest by counting these pulses as they appear.

Since the sector head is in close proximity to information heads in the bank, noises created by recording and switching selection in these nearby heads will be picked up by the sector head. As a result the aforementioned rule is enforced which provides that the selection of the desired track must be established before forward motion of the record card begins. Record noises entering the sector playback system are of no consequence since the sector must already be located if recording has begun and the sector information is of no further interest.

The sector pulse generating system is shown in the block diagram of FIG. 3*f* and the schematic diagram of FIG. 10*a*. The output of the sector head is continuously amplified, even if the search is not on, and fed to the L72 trigger gate. When allowed through the gate, the amplified pulses triggers a one-shot multivibrator which sets the amplitude and time duration of the sector pulse L72 and its complement $\overline{L72}$. The L72 trigger gate is open when the output of the three terminal, negative AND gate L, is low. F71 will be low when the record card 2 is not traveling in the reverse direction. S73 will be low when the record card 2 is not at the home position. $\overline{F9a}$ is a computer signal which is low when the computer is searching for the proper sector, by counting, and goes high as soon as the desired sector pulse appears. The L72 trigger gate therefore is open only when the record card 2 is traveling in the forward direction and the computer is searching for the sector. When the information playback system is described the need for a precisely timed and consistent length sector pulse will become apparent. The start of sector pulse is determined at the edge of a hole which produces a sharp, well-defined pulse at the output of the amplifier. The computer, however, if this is to be a recording, will begin the recording sometime during the sector pulse. Noise therefore may begin to enter the amplifier before the sector pulse is terminated. The computer is also interested in the timing of the end of the sector pulse. It is therefore necessary that the pulse width be independent of this noise. This is accomplished by triggering the one-shot when the playback pulse first appears, closing the gate at the appearance of $\overline{F9a}$, and allowing the one-shot to set the pulse length independent of any noise now appearing in the amplifier. The length of L72 is set at 3 milliseconds and the one-shot is designed to provide this pulse width independent of DC power supplies.

Some typical waveforms at various noted points of the schematic diagram of FIG. 10*a* are shown in FIG. 10*b*.

The input, at point A, is the differential of the flux at the sector head. A negative pulse is produced as the leading edge of the hole appears and a positive pulse as the leading edge of the magnetized oxide appears. The polarization is dependent on the biasing flux and should always be in this direction. The proper waveshape is shown as A at FIG. 10*b*. Time from the leading to the trailing edge of the holes is approximately 4.0 milliseconds. Time between holes is approximately 57.0 milliseconds. Transistors $Q_1$, $Q_2$ and $Q_3$ of FIG. 10*a* form a class A, DC coupled amplifier. Transistor $Q_1$ is in a familiar common emitter connection. Transistor $Q_2$ of FIG. 10*a* is an emitter follower used to increase the input impedance of transistor $Q_3$. This is required since it is essential that the gain of the amplifier be insensitive to transistor parameters. Transistor $Q_3$ is a common emitter connection in which the AC reference (bypass) condenser is returned to a point other than AC ground. The collector resistor of transistor $Q_1$ and the emitter resistors of transistors $Q_2$ and $Q_3$ of FIG. 10*a* are joined and returned to the −24 volt supply through a 1.0K ohm resistor. This junction is used as the AC reference for the emitter of transistor $Q_3$. The capacitor from this junction to ground, .01 microfarad, presents a high impedance to the signal frequency and is used only to bypass high frequency noises appearing on the −24 volt supply. An amplified signal, therefore, appears at this reference point due to collector current in transistor $Q_1$ and emitter current in transistor $Q_2$. The signal voltage across the transsistor $Q_1$ collector load resistor 2K is boot-strapped as is the emitter of transistor $Q_3$ and transistor $Q_2$. The purpose of this method of reference is to provide complete cancellation of large, low frequency, disturbances which are common on the −24 volt supply. Any noise appearing at the reference point, appears also at the transistor $Q_1$ collector and transistor $Q_3$ emitter and, thereby, is canceled. The boot-strapping action provides a large signal at the collector of transistor $Q_1$ when measured with reference to ground. The voltage measured differentially from transistor $Q_1$ collector to the reference point is a true reflection of the gain of transistor $Q_1$. The waveform will be 180° phase shifted with respect to the input as seen at waveform A of FIG. 10*b*. The .001 capacitor from collector transistor $Q_3$ to emitter transistor $Q_1$ of FIG. 10*a* is used to provide rejection through negative feedback of high frequency noise appearing at the input. The output of the class A section is taken from the collector of transistor $Q_3$ and AC coupled to the base of transistor $Q_5$ where it rereferenced to the −6 volt supply. The waveform at this point will be essentially that of waveform A.

Transistor $Q_5$ of FIG. 10*a* and the three diode network on the base of transistor $Q_4$ form the L72 sector pulse trigger gate. Transistor $Q_4$ of FIG. 10*a* is merely a follower matching the high impedance diode net to the low impedance point B. When the logic conditions are such that the computer is searching for the sector, all three diode inputs are low and point B drops to the lower clamp level −6 volts. Current from the +18 volt supply line through the 10K resistor provides a voltage drop through the two diodes, lifting the emitter of transistor $Q_5$ positive with respect to point B. Since both the base of transistor $Q_5$ and point B are referenced at the lower clamp voltage, transistor $Q_5$ is biased off. The back bias on transistor $Q_5$ of FIG. 10*a* provides a threshold on the gate which the positive half of the class A waveform must exceed to trigger L72. The threshold, is used to prevent triggering due to background noise in the sector playback. Background noise is due primarily to imperfections in the record card surface. It is seen from waveform A that no background noise exists when the head gap is over a hole. When the positive peak of the pulse appears, the threshold is exceeded and transistor $Q_5$ turns on. This effectively couples the transistor $Q_5$ emitter current supply, 3.3K to the −24 volt supply line, to the base of transistor $Q_6$. The portion of the positive peak which extends above the threshold can be seen at point B as shown by the waveform B of FIG. 10*b*. The appearance of the positive signal here indicates the clamp diode is turned off and all current is switched through transistor $Q_5$. The current arriving at transistor $Q_6$ base succeeds in triggering the one-shot multivibrator, composed of transistors $Q_6$ and $Q_7$. When any one of the inputs to the diode gate moves positive to ground, indicating the sector is found or is not sought, point B and the emitter of transistor $Q_5$ move up to increase the threshold on transistor $Q_5$. This increased threshold cannot block the large noise pulses due to recordings but, the function is to prevent the collector of transistor $Q_5$ from moving negative, with respect to ground, even if noise pulses do exceed the threshold. Large positive noise pulses appearing at transistor $Q_5$ base can forward bias the collector junction and appear at the collector terminal. The series diode prevents these pulses from reaching transistor $Q_6$ base.

Transistors $Q_6$ and $Q_7$ of FIG. 10*a* form a familiar one-shot multivibrator in which transistor $Q_7$ is biased normally on and transistor $Q_6$ off while a charge is stored on the .5 microfarad capacitor. When transistor $Q_6$ of FIG. 10*a* is triggered ON, the charge forces the base of transistor $Q_7$ positive and off until the capacitor can be discharged through the 10K and potentiometer. The 25K potentiometer provides adjustment to compensate for initial component tolerance. The pulse width is set for a nominal 3.0 milliseconds. The 5.1K and 10.0K divider restores the charge when the one-shot returns to the stable state. This divider is isolated from the load L72 by a diode to insure the charge against load changes. Since both the charging divider and the discharging current are referenced only to the −24 volt supply, the pulse width is independent of supply voltage within the ±25% limits. Note that the L72 signal is unclamped, to provide isolation of the charging divider, and therefore the pulse amplitude at point D is approximately equal to the supply voltage.

*Record system*

Inasmuch as the speed of the record card 2 under the head bank 4 is not constant nor synchronized to a computer clock rate the preferred embodiment of the invention is designed so that the information is self-clocking on playback, complete erasure of old information occurs as part of the write process and time is made available to synchronize the computer with the start of the word to be written or read. The method of recording commonly referred to as phase shift or Ferranti provides the self-clocking and complete write-over characteristics. The writing is done in synchronism with a computer clock pulse. A period of time referred to as the sector pulse time is provided during which the computer clock is located and the actual start of a writing occurs. Unused space on the record card 2, corresponding to the synchronization time, is made available between word sectors on a track. Sometime during the sector pulse, when the computer determines that this is the sector of interest and the proper clock pulse is located, the recording begins with the writing of a preamble to the information word. The preamble is a DC current through the selected head which serves to erase or DC bias the area of the record card 2 leading up to the new word. This erasure is necessary to eliminate any part of an old word which may have existed and started earlier on the card due to differences in synchronization time (time to find the computer clock). The polarity of the DC current is made to be the same as the polarity of the first half of the first pulse to be recorded in the word.

Sample waveforms, pertinent to the record process, are shown in FIG. 11. The horizontal scale is one computer clock time division. Actually this clock is a word time pulse from the computer because the record card system bit time is equal to a computer word time. There is no vertical scale. Some signals such as $\overline{\mathbf{F9}}$ and F10 are derived from computer flip-flops which serve other roles when not used for actual record circuit control. The waveforms for these signals are shown only during the times they are of interest in the explanation.

L72 is the sector pulse or card word time pulse and as shown, arrives asynchronous to the computer pulse T31.

C3 is a computer signal which denotes the time that the sector search is on. When the proper sector pulse is located, $\overline{\mathbf{F9}}$, a second computer signal, is set up and the combination of signals $\overline{\mathbf{F9}}$ and C3 sets the period for writing the preamble.

C4 is also a computer signal, and denotes the time of recording the actual number. The computer moves from C–3 to C–4 at a T31 pulse after L72 disappears. At this point $\overline{\mathbf{F9}}$ is of no further interest in this discussion.

P70 is a signal derived from a monostable multivibrator which is triggered by T31. It provides a symmetrical square wave which is used to divide each card bit time into two equal parts. This signal is used to reverse the head current during each recorded bit. The current reversal supplies the required change in flux in every bit for self-clocking on playback.

F6 is a computer flip-flop which supplies the information to be recorded. A sample word is illustrated. Each bit of information to be recorded is held in F6 for two bit times and is recorded twice on the card. The second bit is used for error detection and is referred to as the check bit.

F10 is a computer flip-flop which is made to alternate on every T31 pulse and provide two conditions during the time of each bit in F6. The signal is used to complement the information presented by F6. A one therefore in F6 is recorded during the first bit time as a one and during the check bit time as a zero. The check bit for a zero in F6 is recorded as a one. It can be shown that this is an aid in error detection during playback.

Rec. I illustrates the effective direction of current in the record head for the example shown. Actually, the head is operated center tapped and the positive portion of the waveform represents current in one-half the head and the negative portion is current in the other half. The windings are wound to provide opposite flux patterns at the gap.

When $\overline{\mathbf{F9}}$ appears, the first bit of information is waiting in F6 and the direction of the preamble current is determined by this bit. P70 and F10 have no effect on the preamble current. When the computer moves to C4 the preamble is stopped and the record current is now influenced by P70 and F10. Note, however, that the first current to be recorded under the new control will be the same as the preamble. Half way down the first bit time, P70 changes state and provides the first current or flux reversal. At the end of the first bit, both F10 and P70 change state resulting in no change of current until half way down the check bit when P70 again reverses. The direction of current or flux change is opposite of that of the first bit providing opposite polarity of check bit. The effects of the three signals P70, F6, F10 are added so that, whenever one or all of the three change state, the head current is reversed. When two change the head current remains unchanged. There is alway current change in the middle of each bit due to P70. The direction of this change determines what the bit will be on playback. The direction of current change due to P70 in the check bits 2, 4, 6, 8, etc., is always opposite of the change in the middle of the preceding bit. It should be remembered that the first bit of information to be recorded must exist in F6 throughout the preamble time as well as during the first two bit times.

*Record circuits*

The record electronics is shown in block form at FIG. 3*a*. The record electronics are shown in schematic form in FIGS. 12, 13 and 14.

Here it can be seen that the actual trigger for the monostable P70 generator is $\overline{\mathbf{T31}}$. The various record inputs P70, F6, F10, etc., control a current switch (see FIG. 12) through standard diode logic networks. The current switch is connected to an amplifier (see FIG. 13) which drives the same two common wires as the playback amplifier. It has already been described, relative to the track address how the selection pyramid connects one head to these two common wires.

The current switch has three possible DC conditions. It may place the drive current to the amplifier on wire L76 or on L77 or on neither. The two former conditions determining direction of head flux current and the latter condition when not recording. The inhibit input is the control for gating the switch off. The condition of the information input determines the direction of head current. Examining the logic driving the gate, it can be seen that recording will be allowed during K41, write, when either $\overline{\mathbf{F9}}$, the preamble signal or C4 the information signal are high.

The final logic networks connecting to the switch are standard except that the resistors form dividers to provide DC level shifts appropriate for driving the switch. The capacitor on the information input line serves to remove crossovers due to switching time of the logical inputs.

When no recording is taking place, the gate input will be low providing drive to saturate transistor $Q_3$ of FIG. 12 which holds the emitter of transistor $Q_1$ and transistor $Q_2$ to ground. The dividers on both transistor $Q_1$ and transistor $Q_2$ bases hold them off and there is no output current. When the gate signal moves high, to 0 volt, transistor $Q_3$ turns off and its collector and the emitters of the transistors $Q_1$ and $Q_2$ move negative until the more positive of the two bases conducts. The current supplied by the 10K resistor will be switched through the ON unit and to the associated collector output lead. The base dividers are arranged so that as the logic moves the base of transistor $Q_1$ of FIG. 12 it will be either positive or negative with respect to the base of transistor $Q_2$. When positive transistor $Q_1$ is on and the output current is to L76 and when negative, transistor $Q_2$ will turn on the output current will be to L77. Transistor $Q_2$ base is at approximately −4 volts DC.

FIG. 13 is a schematic of the record amplifier. The 1K resistors form separate emitter power supplies for the two transistors $Q_1$ and $Q_2$. When not recording both emitters are biased at approximately +9.0 volts. Since there is no drive current on either L76 or L77 wires, both bases are held slightly positive with respect to their respective emitters and therefore off. The two base to emitter diodes help to lower the voltage ratings of these transistors as well as the output units in the current switch. Each collector is connected to one of the common head lines and through one-half of a selected head and the pyramid to ground. The DC voltage is then only slightly above ground. If it should be that no selection were made through the pyramid selection changing, these collectors will move positive as do the common head lines due to the bias current from playback. This increase of voltage will be halted at approximately +9.0 volts when the collectors become forward biased. At this point the transistors $Q_1$ and $Q_2$ will act as inverted emitter followers and no harm results.

When a recording is being made, either L76 or L77 of FIG. 12 is providing drive current to turn a transistor on. Since the emitter supply impedance is high compared to the DC resistance of the head and pyramid, the drive current will pull the emitter down to near the collector potential at approximately +1.0 volt. The transistor acts as essentially a short circuit and the upper 1K resistor is connected in series with one-half the head across the +18 volt supply. The nominal head current is approximately 15 ma. providing 7.5 amp/turns, with one-half the head equal to 500 turns, for recording.

The capacitors emitter to ground provide a low impedance supply at high frequencies and thereby increase the initial head voltage and rate of current build-up.

The diodes, ground to collector, provide clamping of the inductive kick when the transistor turns off.

The capacitors from base to ground are used to shunt high frequency noises picked up on L76 and L77. These wires traverse a lengthy cable since the record logic and current switch are located in the computer and the record amplifier is located at the card transport. This construction was chosen to avoid carrying the many computer logic signals through the cable.

During playback, the record transistors $Q_1$ and $Q_2$ are held off and the collector circuits present a high impedance and therefore do not interfere. The damping diodes are also biased off due to the aforementioned slight positive voltage of the common wires. There is no other disconnect means and it will be shown later that the playback is made to not interfere with the record process.

FIG. 14 is a schematic diagram of the P70 pulse generator. Transistor $Q_1$ of FIG. 14 is used to help reduce loading of the computer signal $\overline{\mathbf{T31}}$. Since $\overline{\mathbf{T31}}$ is normally high (0 volt), transistor $Q_1$ is normally on and there exists a 6.0 volt charge on the input capacitor. Transistors $Q_2$ and $Q_3$ in FIG. 14 form a common monostable multivibrator with the stable condition of transistor $Q_2$ off and transistor $Q_3$ ON. While in the stable condition a charge, determined by the 470 ohm and 2K divider, is placed on the cross coupling capacitor. The output P70 is low (−6 volts) and $\overline{\mathbf{P70}}$ is high (0 volts).

At T31 time the input $\overline{\mathbf{T31}}$ will move low turning transistor $Q_1$ of FIG. 14 off and allowing the input capacitor to discharge through the two 5.1K resistors. The resultant polarity of voltage at the input diode keeps it off. When $\overline{T31}$ returns high transistor $Q_1$ turns on and rapidly charges the capacitor through the input diode and the base of transistor $Q_2$. Transistor $Q_2$ turns ON and the familiar multivibrator action takes place. The potentiometer is adjusted to provide return to the stable condition midway between T31 pulses as shown in FIG. 11. It should be noted that, since both the charge potential and discharge current are direct functions of the −24 volt supply only, the period of P70 is unaffected by voltage variations within ±25%.

*Playback system*

The playback circuits operate continuously. The playback electronics are shown in block form in FIG. 3*b* and in schematic form in FIG. 15. That is, there is no switching on and off of the playback circuits. Therefore, meaningless noise, such as occurs during record operations, is merely amplified and passed on through to the output lines. The computer ignores these meaningless outputs by selecting only the proper time during a read operation in which to view the playback output. The time selection is made by straightforward logic means in the computer and the electronic details will not be covered herein.

The basic playback amplifier input is, of course, the two common head leads on which appears the playback from the selected track. Each sector on the track appears in sequence as they pass under the head. They are all played back and the information extracted and sent to the computer with appropriate sense pulses.

Although the playback is self-clocking the actual sensing is done within the computer. The card system, however, provides the three necessary information lines with which this can be accomplished. One bits appear as positive pulses on one wire, zeros as positive pulses on a second wire, and strobe pulses appear on a third line which indicate the time to sample or sense the former two. The sense or strobe pulse is sent in synchronism with computer time.

In FIG. 11 a playback waveform containing the information recorded in the sample word F6 is illustrated. This playback waveform is not synchronous to any of the record pulses because the speed of the card may have been different between the writing and reading of any given information. It is possible that this information may have even been recorded in a different transport and/or with a different computer. The playback waveform is the derivative of the flux on the track. The smaller positive pulse is a result of the beginning of the preamble and would be under ideal conditions half the normal pulse amplitude. The pulse may not exist at all under many conditions, however, due to unknown time relation with former preamble pulses of the opposite polarity. In any case, this pulse is only of academic interest since it is not used for information recovery.

This waveform is fed to the balanced input of a differential coupled amplifier which may be seen connected to the common head leads in the block diagram of FIG. 3*b*.

The waveform shown in FIG. 11 is impressed across the input terminal A and B. With reference to ground the waveforms on terminal A and B are half amplitude and 180° phase shifted with respect to one another. After sufficient class A amplification in which both phases of the signal are preserved, the two are sent to separate nonlinear switching stages. These final stages are provided with a threshold which the signal must exceed in order to proceed further. The thresholds serve to remove effectively a slice from the center of the playback waveform in FIG. 11 and provide the output pulses termed L70 and L71 as shown in FIG. 3*b*. Whenever the linear output exceeds the threshold in a negative direction, a pulse is produced on L70. Exceeding the threshold in a positive direction produces an output pulse on L71. Pulses on L70 indicate possible zeros and L71 possible ones. As indicated above, not all the pulses on L70 and L71 are useful. Only those which correspond to a flux reversal in the middle of a recorded bit are meaningful. Or, only pulses as a result of flux reversals due to a record current change caused by P70 are of interest. Referring back to the record waveforms, the first change in Rec. I after the preamble is caused by P70 alone (negative going). The second change which is positive is also due to P70 only and both of the foregoing will provide meaningful output pulses on L70 and L71 due to the corresponding flux change. The fifth reversal (negative) is not at the half bit time and is caused by the combination of changes in F6, F10, and P70. The pulse due to this flux reversal on playback will have to be ignored.

In noting how the above is accomplished it should be understood that each word on the playback is preceded by a sector pulse L72 from the sector playback system. The computer determines that this is the sector of interest sometime during an L72 pulse. We have described previously how the first flux reversal following a sector pulse is always a meaningful one and is caused by P70 only. Therefore, the first pulse to appear on L70 and L71 is an information pulse—its value (one or zero) determined by its appearance on L70 or L71. Working from this first pulse, the others are determined as follows. The record waveforms reveal that the time interval between useful flux reversals is equal to twice the time interval between a useful and a meaningless one. Given the first useful pulse, we can set a time delay circuit such that it will be long enough to extend beyond the next meaningless pulse, if one exists, but not long enough to extend beyond the next useful pulse. The half bit rate of P70 guarantees that there will be one useful pulse in each bit period. It can be shown that if the delay circuit described is triggered by each useful pulse, at the end of the delay, another useful pulse will exist on one of the two leads. The delay circuit used for this purpose is a monostable multivibrator which may be seen at FIG. 3*a*. As mentioned earlier the block diagrams of FIG. 3 attempt to serve the dual function of logical description and physical location. One output of the delay circuit is labeled DM and the waveform is shown on FIG. 11. The DM is actually triggered by the trailing edge of each useful pulse. As can be seen on the block diagram of FIG. 3*b* both L70 and L71 are fed to the DM trigger network. Also, an output from the DM is fed back to itself to prevent retriggering by a meaningless pulse which occurs during the delay period.

It becomes obvious now that given an output from the DM and the two pulse trains L70 and L71, it is possible to separate out the useful pulses and determine the information.

All pulses occurring on L70 and L71 are sent to the computer. An accompanying strobe signal must be manufactured to indicate which of the pulses are useful or meaningless. This strobe signal could be obtained from the DM except that it must be synchronized with a high speed computer clock, i.e., high speed as compared to T31. The strobe pulse L75 is manufactured from a standard flip-flop circuit. This network including the flip-flop L75 can be seen in FIG. 3*b*. As a general rule, L75 will be set, and a strobe pulse generated at the end of every DM delay period, if a pulse exists on L70 or L71. The setting of L75 will occur on a computer clock pulse Z3. L75 will reset itself on the following Z3. A trigger gate with temporary memory is provided to avoid the setting of L75 more than once for each cycle of the DM. The L75 trigger gate is closed by L75 when a pulse is accepted. The gate is normally reopened again after the DM completes its next blanking period.

Another input to the L75 trigger gate is the complement of the sector pulse $\overline{L72}$. This pulse is used to prevent noise from triggering of L75 during the period of the sector pulse when it is known that no useful information exists. The source and evaluation of this noise will be discussed later in this section.

Logical operation of the L75 trigger gate may be summarized as follows. An L75 set pulse will be generated whenever a pulse exists on L70 or L71, and it is neither the sector period nor the blanking period due to DM, and the DM has cycled through the blanking period since the last L75 was generated. L75 will always be one computer bit time long and will be approximately 24 microseconds. Included in the L75 trigger gate is an inversion since L75 is a negative trigger flip-flop.

The output from L75 as a result of the above logic is shown in FIG. 11. Whenever an L75 is generated a useful pulse exists on either the L70 or L71 lines above.

An output from the L75 flip-flop is sent back to the playback amplifier. The purpose of this connection is to remove effectively the threshold from the switching stage and thereby increase the gain of the amplifier. The threshold is used to prevent further amplification of low level signals which are presumed to be background noises. Once an L75 is generated, it is assumed that the signal is a valid one, and the threshold is removed to assure that the signal will be strong enough to persist on the output wires and be sensed. This is especially necessary on the first bit, because the DM is not yet operating and therefore an L75 will be generated as soon as the playback exceeds the initial threshold. Since the rate of change of the signal is slow at this point, a small imperfection in the record card 2 surface could temporarily reduce the playback so as to remove the output pulse at the same time L75 appeared. This would provide the computer with a clock and no accompanying bit to sense. Removing the threshold forces this bit to last throughout the clock.

In reconstructing the information, it should be remembered that two bits are recorded for every information bit of the original F6. The second bit of each pair is the redundant or check bit and is of the opposite polarity of the original F6. By extracting the first, third, fifth, etc., bits, one can see that the binary value of these bits on L70 and L71 corresponds to F6.

Even though the system is self-clocking and intended for asynchronous operation, there are limitations on variations in record card 2 speed which can be accommodated. This limit is due primarily to the use of a real time base for the selection of output pulses. The DM circuit provides a fixed delay and as previously stated, must completely blank a meaningless pulse yet stop blanking before the end of the next useful pulse. Assuming all other conditions ideal, the maximum record card 2 speed change that can be tolerated is normally not more than ±25%. Actual record card 2 speed variations generally experienced are less than ±10% and so this has become no great disadvantage. It is important to note that the DM is triggered by the trailing edge of an accepted pulse since it can be shown that some compensation for record card 2 speed change is thus obtained as well as minimized effect of component drift in the DM.

The playback waveform shown in FIG. 11 is idealized to a great extent. The background noise due to imperfections in the record card 2 surface exists here as described previously in the description of the sector playback.

This noise provides pulses at the input during periods when there are no information pulses. It also causes substantial amplitude variations in the information playback. In addition, variations in amplitude are caused by loss of intimate head to record card 2 contact and speed changes. In view of the existence of these noise pulses, it is important to note that once the first bit appears and triggers the DM, the L75 trigger gate is blocked except when a useful information bit is anticipated. As a result, noises occurring when real information does not exist is ignored. Further, since the system is dependent on signal polarity and not amplitude (providing the threshold is exceeded), any noise occurring at useful bit times will do no damage unless it is capable of completely obliterating the playback signal. It will be shown below how even this cannot cause a system error.

Another input to the L75 trigger gate is $\overline{L72}$. The first pulse on L70 or L71 is not due until shortly after $\overline{L72}$ goes high. In the record process, information is not recorded until after the end of the sector pulse. $\overline{L72}$ serves to prevent accepting any pulses during this time and thereby blocks background noise almost up to the time information begins. In normal operation then, the only time the playback is susceptible to pulses due to background noise is the short period of time between the end of the sector pulse and the appearance of the first bit. This period of time is a variable dependent on the time to synchronize with the computer when the recording was made.

It is improbable that a noise pulse of sufficient amplitude will appear at this precise time. In any case, if it should occur, there is time for a maximum of one noise pulse to be accepted into the sensing system before the real information appears. It is described hereafter how such an error will always be detected.

*Playback circuits*

A schematic of the playback circuits including the sensing multivibrator (DM) and the clock flip-flop (L75) appears in FIG. 15.

The input terminals A and B are connected to the common head leads. Since the center tap of the selected head is essentially grounded (AC and DC) through the selection pyramid, the playback waveform appears differentially across A and B. The two input diodes prevent surge currents through the amplifier during a recording. The 10K bias resistors supply current down through the selected head and pyramid path to ground. This current is needed to place the selection diodes as well as the input diodes in the forward low impedance region. The playback signal is small, approximately 20 millivolts, and so the diodes remain in the low impedance condition throughout the complete cycle of the input waveform.

Transistors $Q_1$ and $Q_2$ of FIG. 15 form the first stage and transistors $Q_3$ and $Q_4$ the second stage of a class A differential amplifier. This amplifier provides maximum common mode noise rejection and cancellation of low frequency power supply fluctuations. The capacitor across the input terminals provides cancellation of unbalanced high frequency noise. The playback waveform at the output of the first stage must be viewed with a differential connection from the collector of transistor $Q_1$ to the collector of transistor $Q_2$. This is necessary because at this point the ripple on the power supply exceeds the signal. The ripple is canceled in the second stage and the waveform at the collector of transistor $Q_3$ and transistor $Q_4$ may be viewed single ended and will be similar to the linear waveform shown in FIG. 11. The waveform at the two collectors are 180° phase shifted and are AC coupled to the threshold switches transistors $Q_5$ and $Q_6$. The switch transistors are biased on to saturation with approximately 1 ma. of base drive via the 20K resistors. This 1 ma. of drive sets the threshold at approximately 1 volt across the 1K series input resistor. That is, in order to exceed the threshold and turn off the switch, the input end of the series resistor must be pulled to about 1 volt negative with respect to the base. When the threshold is exceeded, the transistor will turn off and the output L70 or L71 will rise to ground due to the 5.1K collector resistor, clamped by transistors $Q_7$ or $Q_8$ of FIG. 15. The diode from emitter to base, tends to balance the load on the input signal and prevents asymmetrical charging of the coupling capacitor. The connection from $\overline{L75}$ which serves to remove the threshold can be noted here. When a sense pulse L75 is generated $\overline{L75}$ goes low and shunts the bias current through the two high conductance diodes. The series diodes connected to the bases turn off to isolate $\overline{L75}$ from the base circuits. It should be pointed out that even though the quiescent ON bias current is removed on both transistors, only the one transistor where the threshold was exceeded will be off since the opposite input is 180° phase shifted and is now supplying ON drive.

Transistors $Q_7$ and $Q_8$ of FIG. 15 are simple emitter followers used to lower the output impedance to drive the cable and computer loads.

Transistors $Q_9$ and $Q_{10}$ of FIG. 15 form the delay multivibrator (DM). Both L70 and L71 are fed to an input of the DM. There are two input networks to the DM. One causes triggering of the DM due to an accepted output on L70, the other L71. Both triggers are derived in three terminal AND circuits. The other inputs to the ANDs are $\overline{L72}$, the complement of the sector pulse, and $\overline{DM}$, high when the DM is not triggered. The result is that the DM will be triggered by a pulse on L70 or L71 if it is not already running and the sector period is over. It has been described that this causes the DM to be triggered each time a pulse is accepted as valid. Some time during the next valid pulse time, the delay will run out and $\overline{DM}$ will go to ground. At this time either L70 or L71 should be high and one of the input capacitors will be discharged through the 15K and 10K resistors. The actual triggering takes place at the end of the information pulse. When the L70 or L71 drops to −6 volts the formerly discharged input capacitor must gain a 6.0 volt charge which it does through the base of transistor $Q_9$. Transistor $Q_9$ of FIG. 15 turns ON at this point and the DM is triggered. $\overline{DM}$ drops to −6 volts and blocks further triggering until the delay period is over. Transistors $Q_9$ and $Q_{10}$ of FIG. 15 operate as in any common monostable multivibrator and will not be discussed in detail here. It should be noted, however, that a zener regulated supply #50 is used for both the clamping and the discharge current source. This assures the delay period independent of supply variations and at the same time rapid transition between the two states.

The triggering conditions for the sense clock flip-flop are complex and bear repeating prior to circuit examination.

Set L75≡generate a sense pulse
Set L75≡$(L70^{v}L71)\cdot(\overline{DM})\cdot(\overline{L72})\cdot(Z3)\cdot(X^{v}Y)$ Where $L70^{v}L71$≡a possible one or zero present $\overline{DM}$≡DM not running
$\overline{L72}$≡not sector pulse time
Z3≡computer logic clock
X≡DM has cycled since last L75
Y≡several bit times since last L75

The signals X and Y are pseudo signals. That is, the signals, as such, do not really exist but the conditions described are defined by the state of the trigger network. The need for X and Y can be described as follows.

The computer clock Z3 will occur many times during each pulse on L70 and L71. Only one sense pulse must be generated for each accepted one or zero. Condition X provides that only one L75 can be generated for each cycle of the DM. Since the DM is cycled at the end of an accepted one or zero, L75 can be set only once for each valid L70 or L71.

Condition Y is necessary to provide a clock for the first information bit. During the early portion of sector pulse time, the output of the amplifier is uncertain due to the partial cancellation of the pulses caused by the beginning of the preamble. As a result, the last sequence of L75 and DM is unknown. Since a period of several bits will pass during the playback of the preamble in which no pulses are present, condition Y assures ability to set L75 on the first bit.

$\overline{L72}$ is used to reduce the time for accepting pulses due to background noise in the preamble and also allows time for establishing quiescent conditions on L75 and the DM prior to arrival of the first pulse.

Mechanization of the above described logic can be illustrated as follows.

A standard logical OR circuit is formed with the two diodes connecting L70 and L71 to a 10K resistor which provides $(L70^{v}L71)$. This circuit serves as one input to a three terminal AND in which $\overline{L72}$ and $\overline{DM}$ are entered. The output of the AND drives the base of transistor $Q_{11}$ (see FIG. 15) through a resistive divider which merely provides appropriate level shifting. At the base of transistor $Q_{11}$ we have derived in positive form $(L70^{v}L71)\cdot(\overline{DM})\cdot(\overline{72})$.

The term X or Y is derived in negative form on the emitter of transistor $Q_{11}$. When both the base and emitter terms are true, transistor $Q_{11}$ will turn on providing a negative output to the final diode gate which is a negative AND in which the computer clock Z3 is entered. L75 will be set at the appearance of the first Z3 after the input provided by the collector of transistor $Q_{11}$ drops low.

The formation of the term X or Y on the emitter of transistor $Q_{11}$ of FIG. 15 is as follows:

The capacitor on the emitter of transistor $Q_{11}$ of FIG. 15 will be charged to approximately −6 volts in order to provide setting of L75. When the base logic comes true the transistor will turn on. The capacitor is large enough to maintain the −6.0 volt charge in the face of being discharged by the base and collector currents for a period equal to several Z3 pulses. The collector and input to the final diode net will therefore stay low long enough to guarantee the capture of a Z3 and set L75. The L75 output of the flip-flop is fed back through a diode and 1.5K to the emitter of transistor $Q_{11}$. As soon as L75 is set this connection serves to rapidly discharge the capacitor, shutting off transistor $Q_{11}$ and halting further triggering of L75. When L75 is reset, the capacitor will begin to charge again through the 1 megohm resistor. This time constant, however, is very long and the charge is never re-established before the end of the input pulse L70 or L71. Even if it were possible for the charge to move enough negative to turn transistor $Q_{11}$ back on, the 1 megohm resistor could not supply sufficient current to pull the collector negative. Instead when the pulse (L70 or L71) is terminated, i.e., moves negative it triggers the DM. $\overline{DM}$ as a result moves negative and restores the charge on the capacitor through the 1.5K and diode to $\overline{DM}$. At this point $\overline{DM}$ blocks the positive base logic and although the charge is restored transistor $Q_{11}$ remains off. The next opportunity for $Q_{11}$ to be turned on will occur when the delay period is over and $\overline{DM}$ returns to ground. At this point another "valid" L70 or L71 should be present and the cycle repeats. Condition X is thus provided for and it is guaranteed that only one L75 will be supplied with each "valid" information pulse.

Condition Y is supplied by the long time constant of the emitter capacitor and the 1 megohm resistor. During the playback of the preamble the complemented sector pulse ($\overline{L72}$) will be low holding transistor $Q_{11}$ off and preventing triggering of DM. Since neither L75 nor DM will be triggered during this period the 1 megohm resistor will slowly charge the capacitor in preparation for the first pulse after the sector pulse period.

It should be noted that L75 and $\overline{DM}$ could be shorted together through the diode network in the emitter of transistor $Q_{11}$ if L75 were high at the same time as $\overline{DM}$ were low. This situation will never occur under normal circumstances. If it does occur as a result of some circuit triggering malfunction, a reading error has already occurred and since no permanent damage can be done this is of little consequence.

The reset condition for L75 is merely $(L75\cdot Z3)$ which provides a sense pulse one computer logical bit time long. The computer logic bit time is approximately 24 microseconds as compared to a 750 microseconds bit time in the card system. L75 therefore appears as a very sharp pulse when viewed in comparison with the playback pulses and cannot be drawn to scale in FIG. 11.

Transistors $Q_{12}$ and $Q_{13}$ make up the standard M20A flip-flop circuit.

*Error detection*

The major source, by far, of possible errors in the magnetic record card system is the phenomena known as drop-out.

The term drop-out is used to indicate sufficient separation between the head and record medium to cause degradation of resolution and/or amplitude.

Some sources of drop-out may be foreign material on record card surface transported under the head, distortion of the record card due to bends or folds, or loss of magnetic coating on surface due to wear.

The special error detection techniques used in the system are directed primarily to detecting these drop-outs although many other errors may also be discovered in the same manner. This circuit is described in greater detail and claimed in U.S. Patent 3,233,118 issued Feb. 1, 1966 for a "Missing Pulse and Busy Signal Control Circuit" by A. K. Jensen and assigned to the assignee of the instant invention.

A drop-out may occur during either a record or playback operation. In addition there are two specific areas of the system which may be affected. The two areas referred to are the addressing and the information electronics. It is possible that a simultaneous drop-out will be experienced in both areas but it will be shown that only one or the other is significant at any particular instant.

Drop-outs affect the address system in location of sectors. A particular word location on a track is found by counting pulses played back from markers on the sector track. If a drop-out occurs in the area of the marker pulse, loss of playback amplitude could cause loss of a marker and a resultant miscount. Since the operation in process may be a record, it is imperative that the loss of a sector pulse be discovered before the recording begins. Failure to do so will result in the recording being made in a later sector, further down the track, possibly over other irreplaceable information. Means for detecting loss of a sector pulse prior to the start of actual read or write has been provided.

Assuming the proper sector is located one is in a position to experience the affect of a drop-out on information.

A drop-out in the information track once recording has begun will provide a permanent record of the malfunction on the track. This type of error is best guarded against by immediate playback of every word recorded, while the information still exists in the computer. Failure of playback to check with the intended recording can be assumed to be due to a drop-out during record and can be corrected by rerecording followed by a second playback test.

Drop-outs occurring during playback of information, other than for checking a preceding record, are the most difficult to detect since the information exists nowhere else and for this very reason simply must be detected.

When the record card 2 has started its forward travel for a read or write operation, sector pulses should appear at reasonably equal time intervals. If a drop-out should occur, resulting in the loss of a sector pulse, the period between pulses will approximately double. Utilizing the above fact, a circuit referred to as a minimum frequency detector can be used to detect the reduced pulse rate caused by a missing sector. This circuit is shown on the block diagram of FIG. 3*d* and the schematic diagram of FIG. 16. The logical inputs to the circuit are the complemented sector pulse $\overline{L72}$ and a signal from the forward drive solenoid, K70. The pulse rate of $\overline{L72}$ will be measured while the record card is traveling forward. If the rate is unsatisfactory an error signal $\overline{E80}$ appears at the output. The error signal is fed to and provides setting of F71 which results in immediate reversal of the record card. Logic in the computer detects the "involuntary" reversal during a read or write operation as an error. Actually the error has not yet occurred since the sector is yet to be located and the computer program will determine the action to be taken.

When the record card 2 is not traveling forward, i.e., not searching for sector, the signal from the forward solenoid drive K70 will be low (−24 volts). This signal will supply sufficient current through the 10K and 3K resistors of FIG. 16 to bias transistor $Q_1$ on. The emitter of transistor $Q_1$ is grounded through the base of transistor $Q_2$ and the resultant transistor $Q_1$ emitter current provides base drive to maintain transistor $Q_2$ also on. The output signal $\overline{E80}$ is therefore at approximately ground which is the no error condition. Transistor $Q_1$ is saturated and the 10 microfarad capacitor is discharged. The current in the emitter of transistor $Q_1$ and base of transistor $Q_2$ is approximately the sum of the base drive to transistor $Q_1$ and the collector current of transistor $Q_1$ which is determined by the 20K to −24 volts. In this condition $\overline{L72}$ is high (ground) since there are no sector pulses.

When the sector search begins, K70 will move to ground removing the base drive from transistor $Q_1$ of FIG. 16 and shutting it off. With transistor $Q_1$ shut off the 10 microfarad capacitor begins to charge through the 20K collector resistor. This charge path is through the base of transistor $Q_2$ since the current in the 20K exceeds the base bias current (68K to +18). As a result transistor $Q_2$ remains on. When the voltage on the collector of transistor $Q_1$ exceeds the DC level at the variable divider, the clamp diode will turn on and stop further charging of the capacitor. In this event, base drive to transistor $Q_2$ will be halted and the transistor will turn off supplying a negative error signal, $\overline{E80}$. The variable clamp source, however, is adjusted so that prior to achieving a charge of sufficient magnitude to turn on the clamp, the first $\overline{L72}$ will appear (negative) and turn transistor $Q_1$ back on, discharging the capacitor. Note that either transistor $Q_1$ on or the capacitor charging will maintain transistor $Q_2$ on and no error. When the sector pulse is removed, transistor $Q_1$ again turns off and charging of the capacitor resumes. Again prior to complete charge $\overline{L72}$ appears causing discharge. If $\overline{L72}$ appears often enough the capacitor will never achieve sufficient charge to allow transistor $Q_2$ off. If, however, a sector pulse is lost due to drop-out, the time between discharge of the capacitor doubles. In this event full charge will be achieved and transistor $Q_2$ will turn off and supply an error signal.

A capacitor collector to base on transistor $Q_2$ serves to reduce the high frequency gain in the transistor and suppress resultant noise as transistor $Q_2$ slowly traverses the active region.

F171 acts as an input to this circuit and provides regeneration. Previously the emitter follower used to trigger the F71 flip-flop was described. The collector voltage source for this follower is the voltage divider used for the clamp source in the sector detector. Since $\overline{E80}$ is fed to set F71 an increase in current in the emitter follower results in a positiveward voltage change in the clamp voltage. This positive change is coupled through the clamp diode and 10 microfarad capacitor to the base of transistor $Q_2$. Once an error signal is generated and triggering of F71 begins, the feedback forces extension of the $\overline{E80}$ signal. This complication was necessary since as soon as F71 begins to trigger, the forward solenoid drive is removed and the signal K70 returns negative. This would result in cancellation of the $\overline{E80}$. In order to avoid a race condition in complete setting of F71 and cancellation of $\overline{E80}$, the feedback was added. As stated earlier, setting of F71 during a read or write operation returns the record card 2 to the home position and the computer recognizes this as a prevented error.

It should be noted that regardless of the reason for setting F71, current through the follower will result in generating an $\overline{E80}$ due to the feedback condition. That is, every time F71 is set an $\overline{E80}$ will be generated whether or not the initial cause was an error. This is of no consequence, however, since the result is the same. The computer detects the error condition by the abnormal operation of F71.

It would be well to point out again that the missing sector pulse is detected before the error was actually committed. That is, the computer had not yet located the sector for operation and so reading or writing had not yet commenced. If the drop-out condition is of the temporary variety, a second attempt at the operation will be successful.

*Information error detection*

All information drop-outs are detected during playback. Drop-outs which occurred during a recording will not be detected until the playback test is made. The playback test following each record has been discussed previously. Obviously, it is not immediately known on a playback if the drop-out occurred during recording or during the playback test. One could then challenge the decision to make the recording again without another playback test. This is a programming decision and will not be discussed here. The fact of importance is that both kinds of drop-out are discovered on playback and both provide the same error indication.

Only one means of information drop-out detection is provided by the record card reader proper. Other checks are provided by the computer. The record card reader test will be described first.

Description of the playback sensing system and study of the waveforms in FIG. 11 reveals the following. After the arrival of the first playback bit there is always a high signal (0 volts) on L70 or L71 or the DM. Whenever the signal on L70 or L71 leaves, it triggers DM high. When the delay period is over and DM returns low, a signal is present on L70 or L71. This is true so long as the playback signals appear at the normal rate. If a drop-out occurs, the DM will return low and no L70 or L71 will be present. As is shown in the block diagram of FIG. 3*e* and the schematic diagram of FIG. 17 the information drop-out detector is a three terminal OR network with the inputs L70, L71, and DM. Any input high holds the bit drop-out signal $\overline{E81}$ high. A second circuit labeled "initial delay" is also tied to the $\overline{E81}$ output. Its function is described below.

The detection of a drop-out due to coincident lows on L70, L71, and DM is only valid after the first information bit appears. Prior to appearance of the first bit, all three signals are known to be low as the head traverses the preamble. The length of the preamble is a variable dependent on the synchronization time when the recording was made and can be from one to two bits long. The purpose of the initial delay is to hold $\overline{E81}$ high for two bit times after the proper sector is located. The computer signal C44 indicates the proper sector for reading has been located. $\overline{L72}$ is entered to extend the input to the end of the sector marker pulse since C44 will occur at irregular times, due to computer synchronization, during $\overline{L72}$. As soon as both C44 and $\overline{L72}$ go high, signifying the end of the marker pulse of the sector to be read, the initial delay circuit waits two bit times (1.5 milliseconds) and then releases $\overline{E81}$ to the control of the OR circuit.

It is apparent that should the original recording have begun one bit time after the end of the sector marker, a drop-out of the first information bit will go undetected by this system. It will be shown later how this is detected elsewhere.

A delay circuit, identical to that used in the sector detector, is driven by C44 and $\overline{L72}$. C44 is a computer signal which is low until the proper sector pulse is located during a read operation. It will go high some time during the marker pulse. At the end of the marker pulse $\overline{L72}$ also goes high and the delay circuit holds the output high for another two bit times. At this time the first bit should have arrived and transistor $Q_2$ will turn off and the OR circuit will continue to hold $\overline{E81}$ high unless a drop-out occurs. The capacitor from the output to ground is used to hold $\overline{E81}$ high during crossovers which occur because L70 and L71 moving low cause the DM to go high. The capacitor also tends to make the circuit tolerant of information pulses which arrive somewhat later than the fall of DM. The capacitor can be used then to adjust the sensitivity of the circuit to late arriving signals. That is, even though under ideal conditions a signal will be waiting when the DM falls low, it is not essential for proper reader operation. Actually, a signal arriving anywhere in the next 350 microseconds after the DM falls would be properly read. If, however, this occurs, it is certain that the reader is not functioning satisfactorily and so the detector circuit is made to signify a drop-out after approximately 150 microseconds. In conclusion, the reader will occasionally be prevented from reading information which it could have retrieved satisfactorily.

Another means of information error detection is provided by the redundant recording technique. Each information bit recorded is followed immediately by a check bit. The check bit is recorded in the opposite polarity of the real information bit. If the information bit is a one, it will be followed by a zero.

During playback both the information and check bits are fed to the computer. The computer compares each check bit with the immediately preceding information bit and upon finding the proper relationship, discards the check bit.

The redundant technique described above is effective in detecting drop-outs involving loss of an odd number of successive bits. It will be apparent later that this method of drop-out detection is not necessary since all drop-outs are trapped by at least one of the other means. The redundant recording serves a second function, however, in allowing more time for computer synchronization or playback. This allows for greater tolerance of record card transport speed variations. The drop-out detection is merely a by-product.

The redundant or check bit could be recorded in the same polarity as the information bit; however, it can be shown that a drop-out is more likely to be detected in the waveforms produced by the reverse bit method. This will not be proven here.

The redundant recording does offer some protection against altered bits which none of the other checks provide. A cause for altered bits is unknown and, therefore, the value of the protection is also unknown.

A third and valuable means of drop-out detection is also provided by the computer. Following the recording of the 64 bits (32 information, 32 check), the computer records a one followed by the usual zero check bit on the end of each word. After playing back the 32 information and 32 check bits, the computer checks to see that the 33 bit is a one and is accompanied by the proper zero check bit. This test is valuable in detecting a single bit added or lost at the front of the word where the normal drop-out detection is not effective. Either an added or lost bit will cause the one on the end to be shifted one place so that the zero check bit appears in place of the required one or the one shifts to the place of the required zero. The possible appearance of an added bit in front of the word is due to background noise and was discussed in an earlier section. The ineffectiveness of the drop-out detection circuit on the first bit was discussed earlier in this section.

The "tail end" check may also serve to detect drop-outs involving more than one bit but can not be depended on because old information may trail out behind the word which fills the one zero requirement.

FIG. 18 is a plan view of the magnetic record card system which illustrates the physical arrangement of the record card transport, drive sources and computer electronics.

It is thus seen that the apparatus shown and described fully accomplishes the objects of the invention by utilization of the many novel features.

It should be understood that this invention is not limited to specific details of construction and arrangement thereof herein illustrated and that changes and modifications may occur to one skilled in the art without departing from the spirit of the invention; the scope of the invention being set forth in the following claims.

What is claimed is:

1. An apparatus adapted to check for the proper reading of a predetermined number of information signals during a reading operation of information recorded upon a record, said record having a plurality of single channel information sectors, each sector including a predetermined number of information signals and position checking pattern signals immediately following said information signals, said position checking pattern signals being arbitrarily selected and bearing no arithmetic relationship to said information signals associated therewith and being otherwise similar to valid information signals comprising: sensing means adapted to sense the information and position checking pattern signals; control means coupled to said sensing means to initiate a reading operation of the information signals recorded in a selected information sector; preset counting means coupled to said sensing means and adapted to count the predetermined number of information signals recorded in said selected information sector and produce a first signal when said predetermined number is reached; position checking pattern signal reference means for providing second signals indicative of the desired position checking pattern signals; checking means coupled to said position checking pattern signal reference means for receiving said second signals and coupled to said sensing means and adapted to receive said position checking pattern signals from said record and coupled to said counting means and responsive to said first signal to compare said desired position checking pattern signals from said reference means and said position checking pattern signals from said record sensed by said sensing means; and error indicating means coupled to said checking means to produce an error indication if said desired and received position checking pattern signals fail to agree whereby the gain or loss of information signals is indicated.

2. An apparatus as defined in claim 1 wherein said checking means is a two-state flip-flop means; said reference means comprises a logical network for presetting said flip-flop means in accordance with the desired position checking pattern signals and said error indicating means monitors the state of said flip-flop and provides said error indication if the flip-flop remains in an incorrect state after each comparison.

3. An apparatus as defined in claim 2 wherein said record is a record card with a magnetizable layer on one face thereof and said sensing means is a magnetic transducer.

4. An apparatus adapted to check for the proper reading of a predetermined number of information signals during a reading operation of information recorded upon a record card, said record cards having a plurality of single channel information sectors, each sector including a predetermined number of information signals and position checking pattern signals immediately following said information signals, said position checking pattern signals being arbitrarily selected and bearing no arithmetic relationship to said information signals associated therewith and being otherwise similar to valid information signals comprising: sensing means adapted to sense the information and position checking pattern signals; means adapted to move said record cards with respect to said sensing means; first selectively operable control means coupled to said moving means and adapted to cause the positioning of a selected information sector of said record cards with respect to said sensing means; second control means coupled to said sensing means to initiate a reading operation of the information signals recorded in the selected information sector; preset counting means coupled to said sensing means and adapted to count the predetermined number of information signals recorded in said selected information sector and produce a first signal when said predetermined number is reached; position checking pattern signal reference means for providing second signals indicative of the desired position checking pattern signals; checking means coupled to said position checking pattern signal reference means for receiving said second signals and coupled to said sensing means and adapted to receive said position checking pattern signals from said record cards and coupled to said counting means and responsive to said first signals to compare said desired position checking pattern signals from said reference means and said position checking pattern signals from said record cards sensed by said sensing means; and error indication means coupled to said checking means to produce an error indication if said desired and received position checking pattern signals fail to agree whereby the gain or loss of information signals is indicated.

5. An apparatus as defined in claim 4 wherein said checking means is a two-state flip-flop means; said reference means comprises a logical network for presetting said flip-flop in accordance with the desired position checking pattern signals and said error indicating means monitors the state of said flip-flop and provides said error indication if the flip-flop remains in an incorrect state after each comparison.

6. An apparatus as defined in claim 5 wherein said record card is a magnetic record card having a magnetizable layer on one face thereof and said sensing means is a magnetic transducer.

7. An apparatus for checking for the proper reading of a predetermined number of information signals during a reading operation of information recorded upon a record, said record having a plurality of single channel information sectors, each sector including a predetermined number of information signals and position checking pattern signals immediately following said information signals, said position checking pattern signals being arbitrarily selected and bearing no arithmetic relationship to said information signals associated therewith and being otherwise similar to valid information signals comprising: sensing means for sensing information and position checking pattern signals; control means coupled to said sensing means to initiate a reading operation of the information signals recorded in a selected information sector; preset counting means coupled to said sensing means for counting the predetermined number of information signals recorded in said selected information sector and producing a first signal when said predetermined number is reached; position checking pattern signal reference means for providing second signals indication of the desired position checking pattern signals; checking means coupled to said position checking pattern signal reference means for receiving said second signals and coupled to said sensing means for receiving said position checking pattern signals and coupled to said counting means and responsive to said first signal to compare said desired position checking pattern signals from said reference means and said position checking pattern signals from said record sensed by said sensing means; and error indication means coupled to said checking means to produce an error indication if said desired and recorded position checking pattern signals fail to agree whereby the gain or loss of information signals is indicated.

8. An apparatus as defined in claim 7 wherein said checking means is a two-state flip-flop means; said reference means comprises a logical network for presetting said flip-flop in accordance with the desired position checking pattern signals and said error indicating means monitors the state of said flip-flop and provides said error indication if the flip-flop remains in an incorrect state after each comparison.

9. An apparatus as defined in claim 8 wherein said record is a record card with a magnetizable layer on one face thereof and said sensing means is a magnetic transducer.

10. An apparatus for checking for the proper reading of a predetermined number of information signals during a reading operation of information recorded upon a record card, said record card having a plurality of single channel information sectors, each sector including a predetermined number of information signals and position checking pattern signals immediately following said information signals, said position checking pattern signals being arbitrarily selected and bearing no arithmetic relationship to said information signals associated therewith and being otherwise similar to valid information signals comprising: sensing means for sensing information and position checking pattern signals; means to move said record card with respect to said sensing means; first selectively operable control means coupled to said moving means to cause the positioning of a selected information sector of said record card with respect to said sensing means; second control means coupled to said sensing means to initiate a reading operation of the information signals recorded in the selected information sector; preset counting means coupled to said sensing means for counting the predetermined number of information signals recorded in said selected information sector and producing a first signal when said predetermined number is reached; position checking pattern signal reference means for providing second signals indication of the desired position checking pattern signals; checking means coupled to said position checking pattern signal reference means for receiving said second signals and coupled to said sensing means for receiving said position checking pattern signals and coupled to said counting means and responsive to said first signal to compare said desired position checking pattern signals from said reference means and said position checking pattern signals from said record card sensed by said sensing means; and error indication means coupled to said checking means to produce an error indication if said desired and recorded position checking pattern signals fail to agree whereby the gain or loss of information signals is indicated.

11. An apparatus as defined in claim 10 wherein said checking means is a two-state flip-flop means; said reference means comprises a logical network for presetting said flip-flop in accordance with the desired position checking pattern signals and said error indicating means monitors the state of said flip-flop and provides said error indication if the flip-flop remains in an incorrect state after each comparison.

12. An apparatus as defined in claim 11 wherein said record card is a magnetic record card having a magnetizable layer on one face thereof and said sensing means is a magnetic transducer.

References Cited

UNITED STATES PATENTS

| | | | |
|---|---|---|---|
| 2,275,609 | 3/1942 | Bryce | 346—74 |
| 2,722,676 | 11/1955 | Begun | 340—174.1 |
| 2,918,656 | 12/1959 | Nolde et al. | 340—174.1 |
| 2,925,586 | 2/1960 | Levy | 340—174 |
| 2,929,049 | 3/1960 | Lubkin | 340—174 |
| 2,952,008 | 9/1960 | Mitchell et al. | 340—174 |
| 2,975,407 | 3/1961 | O'Brien | 340—174.1 |
| 3,008,005 | 11/1961 | Barry et al. | 178—23 |
| 3,012,230 | 12/1961 | Galas et al. | 340—172.5 |
| 3,078,448 | 2/1963 | O'Brien | 340—174.1 |
| 3,235,714 | 2/1966 | Oliari et al. | 235—61.11 |
| 3,257,545 | 6/1966 | Van Berkel et al. | 235—61.12 |

MALCOLM A. MORRISON, *Primary Examiner.*

IRVING L. SRAGOW, M. K. KIRK, K. MILDE, *Assistant Examiners.*

UNITED STATES PATENT OFFICE

CERTIFICATE OF CORRECTION

Patent No. 3,349,369 October 24, 1967

Alan K. Jensen

It is certified that error appears in the above identified patent and that said Letters Patent are hereby corrected as shown below:

Column 7, line 51, "exit" should read -- exist --.

Signed and sealed this 14th day of April 1970.

(SEAL)
Attest:

Edward M. Fletcher, Jr.
Attesting Officer

WILLIAM E. SCHUYLER, JR.
Commissioner of Patents